US012573415B2

(12) United States Patent
Namba et al.

(10) Patent No.: US 12,573,415 B2
(45) Date of Patent: Mar. 10, 2026

(54) SIGNAL PROCESSING DEVICE AND METHOD, LEARNING DEVICE AND METHOD, AND PROGRAM

(71) Applicant: Sony Group Corporation, Tokyo (JP)

(72) Inventors: Ryuichi Namba, Tokyo (JP); Makoto Akune, Tokyo (JP)

(73) Assignee: Sony Group Corporation, Tokyo (JP)

( * ) Notice: Subject to any disclaimer, the term of this patent is extended or adjusted under 35 U.S.C. 154(b) by 347 days.

(21) Appl. No.: 18/031,851

(22) PCT Filed: Oct. 6, 2021

(86) PCT No.: PCT/JP2021/036906

§ 371 (c)(1),
(2) Date: Apr. 13, 2023

(87) PCT Pub. No.: WO2022/085442

PCT Pub. Date: Apr. 28, 2022

(65) Prior Publication Data

US 2023/0386490 A1 Nov. 30, 2023

(30) Foreign Application Priority Data

Oct. 20, 2020 (JP) ................................ 2020-175801

(51) Int. Cl.
*G10L 21/02* (2013.01)
*G10L 19/005* (2013.01)

(52) U.S. Cl.
CPC ............ *G10L 21/02* (2013.01); *G10L 19/005* (2013.01)

(58) Field of Classification Search
CPC ................................ G10L 21/02; G10L 19/05
See application file for complete search history.

(56) References Cited

U.S. PATENT DOCUMENTS

2011/0082574 A1* 4/2011 Pachet ................ A01K 29/005 700/94
2017/0366896 A1 12/2017 Adsumilli
(Continued)

FOREIGN PATENT DOCUMENTS

CN 105900456 A 8/2016
CN 110663173 A 1/2020
(Continued)

OTHER PUBLICATIONS

International Search Report and English translation thereof mailed Jan. 11, 2022 in connection with International Application No. PCT/JP2021/036906.
(Continued)

*Primary Examiner* — Mohammad K Islam
(74) *Attorney, Agent, or Firm* — Wolf, Greenfield & Sacks, P.C.

(57) ABSTRACT

The present technique relates to a signal processing device, a signal processing method, a learning device, a learning method, and a program enabling acquisition of a target sound having high quality.
A learning device including a learning unit configured to perform learning on the basis of one or a plurality of sensor signals acquired by one or a plurality of sensors mounted on an object and a target signal relating to the object and corresponding to a predetermined sensor and generate coefficient data configuring a generator having the one or the plurality of sensor signals as its inputs and having the target signal as its output. The present technique can be applied to a learning device.

18 Claims, 23 Drawing Sheets

(56) References Cited

U.S. PATENT DOCUMENTS

| | | | | |
|---|---|---|---|---|
| 2018/0332420 | A1* | 11/2018 | Salume | H04S 3/002 |
| 2019/0103848 | A1 | 4/2019 | Shaya | |
| 2019/0208317 | A1 | 7/2019 | Woodruff | |
| 2019/0364375 | A1 | 11/2019 | Soto | |
| 2020/0322722 | A1 | 10/2020 | Chen | |
| 2023/0139295 | A1* | 5/2023 | Bergkvist | G06F 3/012 2/2.11 |

FOREIGN PATENT DOCUMENTS

| | | | | | |
|---|---|---|---|---|---|
| CN | 113396337 | A | * | 9/2021 | H04N 13/332 |
| EP | 387791 | A | | 9/1990 | |
| EP | 2916321 | A1 | * | 9/2015 | G10L 21/0208 |
| EP | 3373602 | A1 | * | 9/2018 | H04R 3/005 |
| JP | 2010054728 | A | | 3/2010 | |
| JP | 2011-081383 | A | | 4/2011 | |
| JP | 2017-205213 | A | | 11/2017 | |
| JP | 2020-162765 | A | | 10/2020 | |
| JP | 7388432 | B2 | | 11/2023 | |
| WO | WO 2020/208926 | A1 | | 10/2020 | |

OTHER PUBLICATIONS

International Written Opinion and English translation thereof mailed Jan. 11, 2022 in connection with International Application No. PCT/JP2021/036906.

International Preliminary Report on Patentability and English translation thereof mailed May 4, 2023 in connection with International Application No. PCT/JP2021/036906.

Extended European Search Report issued Mar. 4, 2024 in connection with European Application No. 21882583.4.

* cited by examiner

Fig. 1

| CONDITION/SENSOR | MICROPHONE | ACCELERATION SENSOR | GYRO SENSOR | GEOMAGNETIC SENSOR | GPS/INDOOR RANGING |
|---|---|---|---|---|---|
| AT TIME OF TRAINING /REHEARSAL | ○ | ○ | ○ | ○ | ○ |
| AT TIME OF GAME/ ACTUAL PERFORMANCE | × | ○ | ○ | ○ | ○ |

SIGNAL PROCESSING DEVICE AND METHOD, LEARNING DEVICE AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/036906, filed in the Japanese Patent Office as a Receiving Office on Oct. 6, 2021, which claims priority to Japanese Patent Application Number JP2020-175801, filed in the Japanese Patent Office on Oct. 20, 2020, each of which is hereby incorporated by reference in its entirety.

TECHNICAL FIELD

The present technique relates to a signal processing device and a signal processing method, a learning device and a learning method, and a program and, more particularly, to a signal processing device and a signal processing method, a learning device and a learning method, and a program capable of acquiring high-quality target sound.

BACKGROUND ART

In sound field reproduction of a free viewpoint such as a bird's view, a walk-through, or the like, it is important to record a target sound of a sound source with a high signal to noise ratio (SN ratio), and, at the same time, it is necessary to acquire information representing a position and an azimuth of each sound source.

As specific examples of the target sound of a sound source, for example, a voice of a person, general operation sounds of a person such as a walking sound and a running sound, operation sounds unique to contents of sports, a play, and the like such as a kicking sound of a ball, and the like can be given. In addition, for example, as a technology relating to recognition of a user's action, a technology enabling acquisition of one or a plurality of results of recognition of a user's action by analyzing ranging sensor data detected by a plurality of ranging sensors has been proposed (for example, see PTL1).

CITATION LIST

Patent Literature

PTL 1

Japanese Patent Laid-open No. 2017-205213

SUMMARY

Technical Problem

However, in a case in which sports, a play, and the like are recorded as contents of a free viewpoint, it is also difficult to acquire a target sound of a sound source with a high SN ratio like a case in which a device in which a microphone is mounted cannot be mounted on a player or the like serving as a sound source or the like. In other words, it is difficult to acquire a target sound having high quality.

The present technique is in view of such situations and enables acquisition of a target sound having high quality.

Solution to Problem

According to a first aspect of the present technique, there is provided a learning device including a learning unit configured to perform learning on the basis of one or a plurality of sensor signals acquired by one or a plurality of sensors mounted on an object and a target signal relating to the object and corresponding to a predetermined sensor and generate coefficient data configuring a generator having the one or the plurality of sensor signals as its inputs and having the target signal as its output.

According to the first aspect of the present technique, there is provided a learning method or a program including a step of performing learning on the basis of one or a plurality of sensor signals acquired by one or a plurality of sensors mounted on an object and a target signal relating to the object and corresponding to a predetermined sensor and generating coefficient data configuring a generator having the one or the plurality of sensor signals as its inputs and having the target signal as its output.

In the first aspect of the present technique, learning is performed on the basis of one or a plurality of sensor signals acquired by one or a plurality of sensors mounted on an object and a target signal relating to the object and corresponding to a predetermined sensor, and coefficient data configuring a generator having the one or the plurality of sensor signals as its inputs and having the target signal as its output is generated.

According to a second aspect of the present technique, there is provided a signal processing device including: an acquisition unit configured to acquire one or a plurality of sensor signals acquired by one or a plurality of sensors mounted on an object; and a generation unit configured to generate a target signal relating to the object and corresponding to a predetermined sensor on the basis of coefficient data configuring a generator generated in advance through learning and the one or the plurality of sensor signals.

According to the second aspect of the present technique, there is provided a signal processing method or a program including a step of: acquiring one or a plurality of sensor signals acquired by one or a plurality of sensors mounted on an object; and generating a target signal relating to the object and corresponding to a predetermined sensor on the basis of coefficient data configuring a generator generated in advance through learning and the one or the plurality of sensor signals.

In the second aspect of the present technique, one or a plurality of sensor signals acquired by one or a plurality of sensors mounted on an object are acquired, and a target signal relating to the object and corresponding to a predetermined sensor is generated on the basis of coefficient data configuring a generator generated in advance through learning and the one or the plurality of sensor signals.

BRIEF DESCRIPTION OF DRAWINGS

FIG. 1 is a diagram illustrating examples of device configurations at the time of training and at the time of content recording.

DESCRIPTION OF EMBODIMENTS

Figure 2:
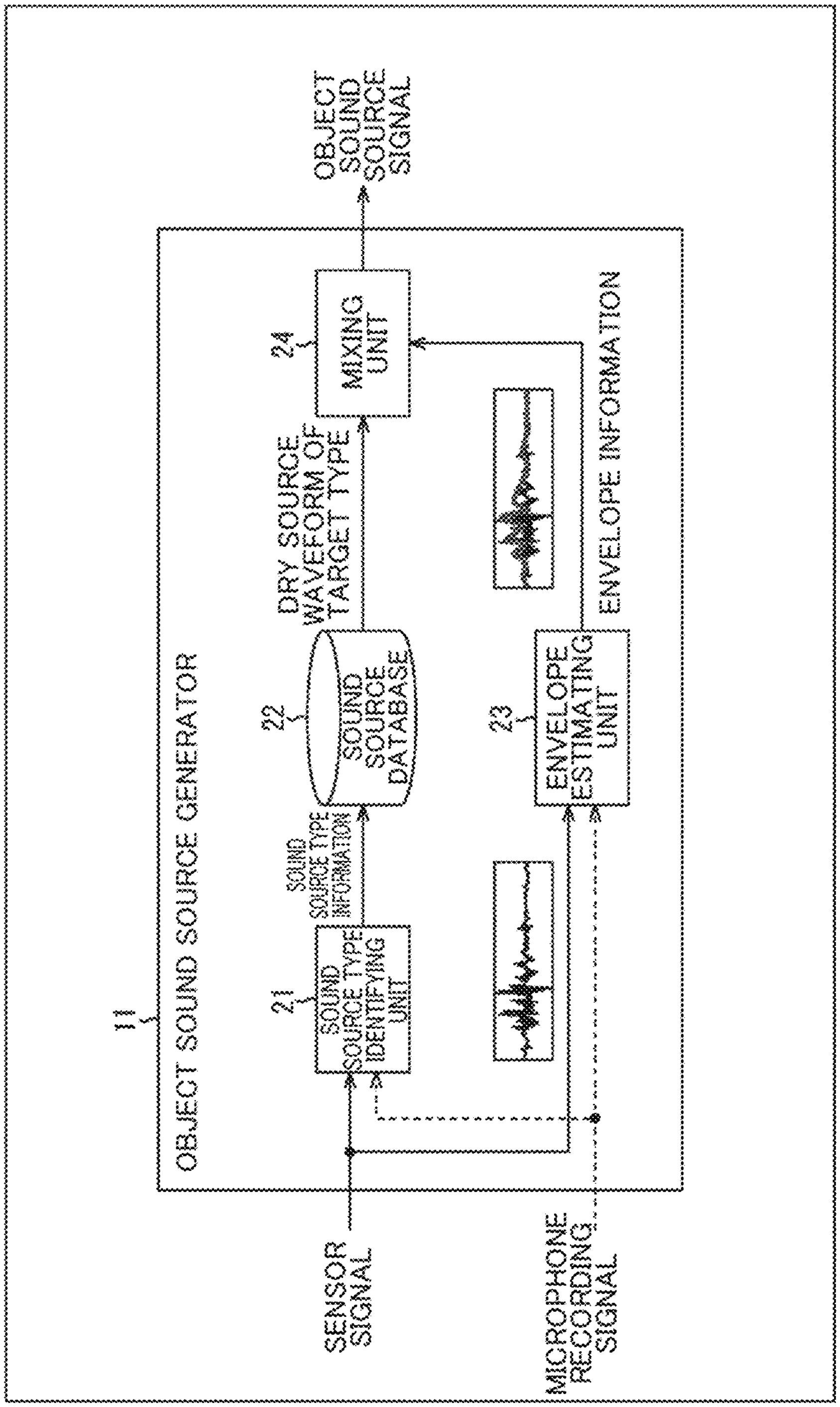
FIG. 2 is a diagram illustrating a configuration example of an object sound source generator.

Hereinafter, embodiments to which the present technique is applied will be described with reference to the drawings.

First Embodiment

<Present Technique>

The present technique enables acquisition of a target signal having high quality by generating a signal corresponding to a sensor signal acquired by another sensor on the basis of sensor signals acquired by one or a plurality of sensors.

For example, sensors described here, for example, are a microphone, an acceleration sensor, a gyro sensor, a geomagnetic sensor, a ranging sensor, an image sensor, and the like.

Hereinafter, an example in which an object sound source signal corresponding to a microphone recording signal acquired by a microphone in a state in which the microphone is mounted on an object is generated as a signal to be targeted from sensor signals of one or a plurality of sensors such as acceleration sensors of which types are different from each other will be described. In addition, the signal to be targeted (a target signal) is not limited to the object sound source signal and may be any signal such as a video signal of an animation or the like.

For example, there are a small number of existing wearable devices having a function of recording voice and an operation sound with high sound quality at the time of movement. There are devices used mainly in the broadcasting industry in which a transmitter configured to be small and strong is combined with a Lavalier microphone. However, in such devices, no sensors other than microphones are disposed.

In addition, although there are wearable devices for the use of analyzing movement in which sensors acquiring position information and movement information at the time of movement are mounted, such devices do not have a function of acquiring voice or are not specialized for acquisition of voice even in the case of having such a function.

For this reason, there is no device that simultaneously acquires a voice, position information, and movement information with a high SN ratio at the time of movement and generates an object sound source using them.

Thus, in the present technique, an audio signal (an acoustic signal) for reproducing a sound of a target object sound source, that is, an object sound source signal, is configured to be able to be generated from acquired sensor signals such as position information, movement information, and the like.

For example, it is assumed that a plurality of objects are present inside the same target space, and a recording device for recording contents is mounted or built into each of the objects.

At this time, it is assumed that a sound emitted due to an object in which the recording device is mounted or built is recorded as a sound (sound recording) of an object sound source.

For example, the target space is regarded as a space or the like of sports, an opera, a play, a movie, or the like in which a plurality of players, performers, and the like are present.

In addition, for example, an object inside a target space may be a mobile body or a still body as long as it serves as a sound source (an object sound source). More specifically, for example, an object may be a person such as a sports player, a robot or a vehicle in which a recording device is mounted or built in, a flying object such as a drone, or the like.

In a recording device, for example, a microphone used for receiving a sound of an object sound source, a movement measurement sensor such as a 9-axis sensor used for measuring movement and an orientation (azimuth) of an object, a ranging sensor and a positioning sensor used for measuring a position, a camera (an image sensor) used for capturing a video of surroundings, and the like are disposed.

Here, a ranging sensor (a ranging device) and a positioning sensor, for example, are a Global Positioning System (GPS) device used for measuring a position of an object, an indoor ranging signal receiver, and the like and can acquire position information representing a position of an object using the indoor ranging sensor and the positioning sensor.

In addition, from an output of a movement measurement sensor disposed in a recording device, movement information representing a motion of an object such as a speed, an acceleration, and the like, a direction (an azimuth) of the object, and move of the object can be acquired.

In a recording device, by using a microphone, a movement measurement sensor, a ranging sensor, and a positioning sensor built thereinto, a microphone recording signal acquired by receiving a sound of surroundings of an object, position information of the object, and movement information of the object can be acquired. In addition, in a case in which a camera is disposed in the recording device, a video signal of a video of surroundings of the object can also be acquired.

The microphone recording signal, the position information, the movement information, and the video signal acquired for each object in this way can be used for acquiring an object sound source signal that is an acoustic signal of a sound of an object sound source that is a target sound.

Here, a sound of an object sound source that is regarded as a target sound, for example, is an operation sound such as a walking sound, a running sound, a respiratory sound, a clapping sound, or the like of a person who is an object, and, it is apparent that, other than that, a spoken voice or the like of a person who is an object may be regarded as a sound of an object sound source.

In such a case, for example, by detecting a time section in which a target sound such as an operation sound or the like of each object is present using the microphone recording signal, the position information, and the movement information and performing signal processing for separating the target sound from the microphone recording signal on the basis of a result of the detection, an object sound source signal of each sound source type may be considered to be generated for each object. In addition, it may be considered to integrally use the position information and the movement information acquired by a plurality of recording devices in generation of an object sound source signal.

In such a case, a signal having high quality can be acquired as an object sound source signal used for free viewpoint reproduction.

However, actually, sensor signals of all types (kinds) of a microphone recording signal, an output of an acceleration sensor, and the like may not be acquired when a content is recorded.

More specifically, for example, a microphone is unable to be used in a case in which there is a restriction on the weight of a recording device such that it does not hinder the performance of a person on whom the recording device is mounted, and in a case when using recorded voice for broadcasting, in order not to broadcast unintended voice such as a that of a strategy or the like.

Thus, in the present technique, by acquiring more sensor signals than those at the time of recording contents, at a timing different from that at the time of recording contents and learning an object sound source generator, an object sound source signal, which is unable to be acquired at the time of recording contents, can be acquired from the sensor signals acquired at the time of recording contents.

As a specific example, for example, a case in which a sports game, a play, or the like is recorded as a content or the like may be considered.

In such a case, data is recorded with a device configuration of a recording device being changed between at the time of training (practicing) and at the time of rehearsal also including a trial game and the like and at the time of performance, that is, at the time of recording contents such as at the time of a game, at the time of actual performance, and the like.

As an example, for example, a device configuration as illustrated in FIG. 1 may be used.

In the example illustrated in FIG. 1, at the time of training and at the time of rehearsal, as sensors used for recording data, a microphone, an acceleration sensor, a gyro sensor, a geomagnetic sensor, and position measuring sensor for a GPS, indoor ranging, and the like (a ranging sensor and a positioning sensor) are disposed in the recording device.

At the time of training and at the time of rehearsal, the weight of a recording device may be heavy, and battery exchange can be performed midway through, and thus all the sensors including a microphone are mounted in the recording device, and all the acquirable sensor signals are acquired. In other words, a recording device of a high-level function including a microphone is mounted on a player or a performer, and sensor signals are acquired (collected).

Learning is performed on the basis of sensor signals acquired at the time of training and at the time of rehearsal in this way, whereby an object sound source generator is generated.

In contrast to this, at the time of a game and at the time of actual performance, as sensors used for recording data, an acceleration sensor, a gyro sensor, a geo magnetic sensor, and position measurement sensors for a GPS, indoor ranging, and the like are disposed in the recording device. In other words, at the time of a game and at the time of performance, no microphone is disposed.

At the time of a game and at the time of actual performance, only some sensors among the sensors mounted at the time of training and at the time of rehearsal are mounted in a recording device, and thus a light weight of the recording device and an increase in a battery duration time are achieved. In other words, at the time of a game and at the time of actual performance, types, the numbers, and the like of mounted sensors are narrowed down, and sensor signals are acquired by a recording device having a light weight and low power consumption.

Particularly, at the time of a game or at the time of actual performance, a battery is assumed to be unexchangeable, and the battery is assumed not to be insufficient from start of the game or the actual performance to the end thereof. In addition, in this example, at the time of a game and at the time of actual performance, no microphone is mounted, and thus recording and leakage of inappropriate speech in live broadcast or the like such as a player's speech about a strategy and the like can be prevented. Furthermore, in some sports and the like, although there is a possibility of mounting of a microphone being prohibited, also in such a case, sensor signals of sensors other than the microphone can be acquired.

When sensor signals of sensors of different types (kinds) other than the microphone are acquired at the time of a game or at the time of actual performance, an object sound source signal is generated on the basis of such sensor signals and an object sound source generator acquired in advance through learning. In a case in which a microphone is mounted on a recording device at the time of a game or at the time of actual performance, in other words, in a case in which a microphone is mounted on an object, this object sound source signal is an object sound source signal corresponding to a microphone recording signal acquired by the microphone. In addition, the generated object sound source signal may correspond to a microphone recording signal, may correspond to (be associated with) a signal of a sound of an object sound source generated from a microphone recording signal, or may be a signal used for reproducing a sound corresponding to a sound of an object sound source generated from a microphone recording signal.

In learning for an object sound source generator, sensor signals recorded (acquired) at the time of training or at the time of a rehearsal are utilized, and in-advance information such as individualities of a player or a performer on whom the recording device is mounted, acquisition environments of sensor signals, and the like can be acquired (learned).

Then, at the time of recording contents, in other words, at the time of a game or at the time of actual performance, an object sound source signal of an operation sound or the like of an object such as a player is estimated (restored) on the basis of the in-advance information (the object sound source generator) of individualities and the like and a small number of sensor signals at the time of contents recording.

In this way, a signal having high quality can be acquired as an object sound source signal of a sound (target sound) of an object sound source that is a target such as an operation sound of a player or the like while reducing the physical load of a player or a performer at the time of recording contents or further lengthening a drive time of the recording device.

In addition, in the present technique, at the time of recording contents, also in a case in which a microphone cannot be disposed in a recording device, in a case in which a signal of a microphone or another sensor cannot be acquired due to a malfunction or the like, a case in which a sensor signal having a high SN ratio cannot be acquired due to a bad recording environment or the like, and the like, an object sound source signal having high quality can be robustly acquired.

Here, the object sound source generator will be described further.

The object sound source generator, for example, may be any type such as a type in which a Deep Neural Network (DNN) or a parametric representation scheme is used, or the like as long as it can acquire an object sound source signal corresponding to a target sensor signal from one or a plurality of sensor signals.

For example, in an object sound source generator of the parametric expression scheme, the sound source type of a target object sound source is restricted, and a sound source type of an object sound source such as a kicking sound or a running sound, which is emitted, is identified from one or a plurality of sensor signals.

Then, on the basis of a result of identification of a sound source type and an envelope of a signal intensity (amplitude) of a sensor signal of an acceleration sensor, parametric signal processing is performed on a signal of a dry source waveform of an object sound source prepared in advance, whereby an object sound source signal is generated.

For example, such an object sound source generator may have a configuration as illustrated in FIG. 2.

In the example illustrated in FIG. 2, the object sound source generator 11, for example, has sensor signals of a plurality of sensors of mutually-different types as inputs and, in a case in which a microphone is disposed in a recording device mounted in an object, outputs an object sound source signal corresponding to a microphone recording signal acquired by the microphone.

The object sound source generator 11 includes a sound source type identifying unit 21, a sound source database 22, an envelope estimating unit 23, and a mixing unit 24.

Sensor signals acquired by sensors other than the microphone installed in a recording device mounted in an object such as a player or the like serving as an object sound source are supplied to the sound source type identifying unit 21 and the envelope estimating unit 23. Here, a sensor signal acquired by at least an acceleration sensor is included as the sensor signals of the sensors other than the microphone.

In addition, in a case in which a microphone recording signal acquired by a microphone disposed in a recording device mounted on an object or a microphone disposed in a recording device mounted in another object can be used, the acquired microphone recording signal is also supplied to the sound source type identifying unit 21 and the envelope estimating unit 23.

When one or a plurality of sensor signals including a microphone recording signal are supplied, by appropriately performing an arithmetic operation based on the supplied sensor signals and a coefficient acquired in advance through learning, the sound source type identifying unit 21 estimates a type of object sound source, in other words, a type of sound emitted from the object. The sound source type identifying unit 21 supplies sound source type information representing a result of estimation (a result of identification) of a sound source type to the sound source database 22.

For example, the sound source type identifying unit 21 is assumed to be an identifying unit or the like using an arbitrary machine learning algorithm such as a generalized linearity determiner or a Support Vector Machine (SVM).

The sound source database 22 stores a dry source signal that is an acoustic signal having a dry source waveform for reproducing a sound of an object emitted from an object sound source for each sound source type. In other words, the sound source database 22 stores sound source type information and a dry source signal of a sound source type represented by the sound source type information in association with each other.

For example, a dry source signal may be any signal such as a signal acquired by actually recording a sound of an object sound source under an environment having a high SN ratio, a signal that is artificially generated, a signal generated from a microphone recording signal recorded from a microphone of a recording device for learning through extraction or the like, or the like. In addition, a plurality of dry source signals may be stored in association with one piece of sound source type information.

The sound source database 22 supplies one of a plurality of dry source signals of a sound source type represented by the sound source type information supplied from the sound source type identifying unit 21 among dry source signals of respective sound source types that are stored to the mixing unit 24.

The envelope estimating unit 23 extracts an envelope of the supplied sensor signal of the acceleration sensor and supplies envelope information representing the extracted envelope to the mixing unit 24.

For example, an amplitude of a predetermined component in a time section, which has a predetermined length, of a sensor signal of an acceleration sensor is smoothed with respect to time and is extracted as an envelope by the envelope estimating unit 23 For example, in a case in which an object sound source signal of a walking sound is generated as a sound of an object sound source, the predetermined component described here is set to one or a plurality of components including a component of at least a gravity direction.

In addition, at the time of extracting an envelope, a microphone recording signal and sensor signals of other sensors other than the acceleration sensor and the microphone may be also used as necessary.

The mixing unit 24, by performing signal processing on one or a plurality of dry source signals supplied from the sound source database 22 on the basis of the envelope information supplied from the envelope estimating unit 23, generates and outputs an object sound source signal.

For example, the signal processing performed by the mixing unit 24 is set as a modulation process for the waveform of a dry source signal based on a signal intensity of an envelope represented by the envelope information, filtering for a dry source signal based on the envelope information, a mixing process of mixing a plurality of dry source signals, and the like.

A technique for generating an object sound source signal in the object sound source generator 11 is not limited to the example described here. For example, the identifying unit used for identifying a sound source type and the like, the technique for estimating an envelope, the technique for generating an object sound source signal from dry source signals, and the like may be arbitrary, and the configuration of the object sound source generator is not limited to the example illustrated in FIG. 2 and may be another configuration.

Configuration Example of Recording Device and Learning Device

Next, a more detailed embodiment of the present technique described above will be described.

First, in a case in which performance (actual performance) such as a game of sports, a play, or the like is recorded as a content, an example in which an object sound source signal is generated in a case in which a microphone cannot be used, or no microphone is disposed in a recording device will be described.

In this example, the object sound source generator 11 generating an object sound source signal from sensor signals of sensors of other types different from that of the microphone is generated through machine learning.

Figure 3:
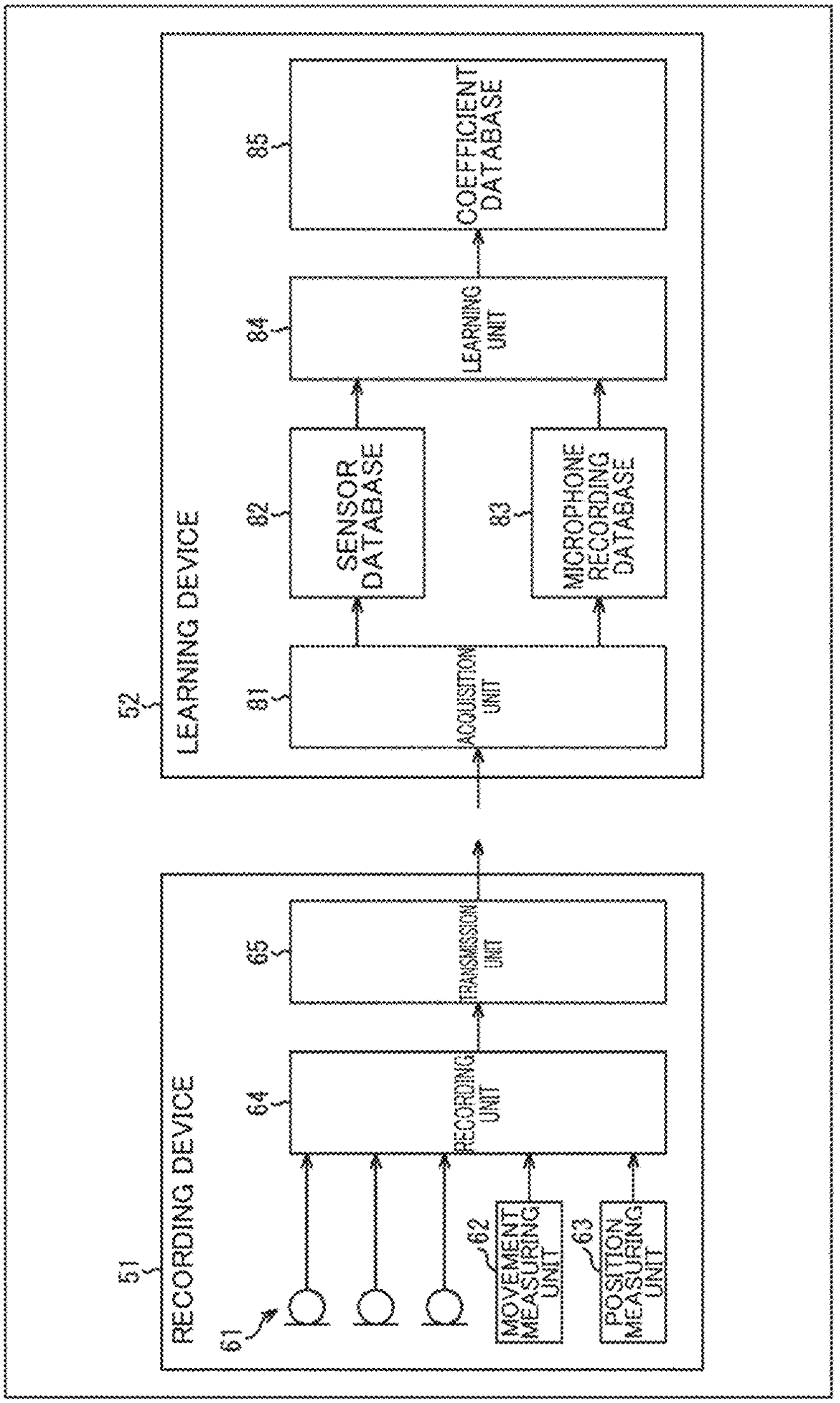
FIG. 3 is a diagram illustrating a configuration example of a recording device and a learning device.

For example, a recording device acquiring sensor signals for learning for the object sound source generator 11 and a learning device performing learning of the object sound source generator 11 are configured as illustrated in FIG. 3. Here, although one recording device is illustrated, the number of recording devices may be one, or a plurality of recording devices may be provided for each object.

In the example illustrated in FIG. 3, sensor signals acquired by a recording device 51 that is mounted or built into an object such as a mobile body are transmitted to a learning device 52 as transmission data and are used for learning of the object sound source generator 11.

The recording device 51 includes a microphone 61, a motion measuring unit 62, a position measuring unit 63, a recording unit 64, and a transmission unit 65.

The microphone 61 receives a sound of surroundings of the recording device 51 and supplies a microphone recording signal that is a sensor signal acquired as a result thereof to the recording unit 64. In addition, the microphone recording signal may be either a monaural signal or a multichannel signal.

The motion measuring unit 62, for example, is formed from sensors used for measuring a motion and a direction of an object such as a 9-axis sensor or a geometric sensor, an acceleration sensor, and a gyro sensor and outputs sensor signals representing measurement results (sensed values) thereof to the recording unit 64 as movement information Particularly, when sound reception is performed using the microphone 61, the motion measuring unit 62 measures a motion and a direction of an object and outputs movement information representing a result thereof. In addition, the movement information may be one sensor signal or may be sensor signals of a plurality of sensors of mutually-different types.

The position measuring unit 63, for example, is formed from a ranging sensor and a positioning sensor such as a GPS device and an indoor ranging signal receiver, measures a position of an object in which the recording device 51 is mounted, and outputs a sensor signal representing a result of the measurement to the recording unit 64 as position information.

In addition, the position information may be one sensor signal or may be sensor signals of a plurality of sensors of mutually-different types. In addition, a position represented by the position information, in more detail, a position of an object (the recording device 51) acquired from the position information, for example, is set as coordinate information with reference to a predetermined position inside a recording space such as a game venue or a theater or the like.

A microphone recording signal, movement information, and position information are acquired at the same time during the same period.

The recording unit 64 appropriately performs Analog-to-Digital (AD) conversion and the like on a microphone recording signal supplied from the microphone 61, movement information supplied from the motion measuring unit 62, and position information supplied from the position measuring unit 63 and supplies the microphone recording signal, the movement information, and the position information to the transmission unit 65.

The transmission unit 65 generates transmission data including a microphone recording signal, movement information, and position information by performing a compression process and the like on the microphone recording signal, the movement information, and the position information supplied from the recording unit 64 and transmits the transmission data to the learning device 52 via a network or the like.

In addition, an image sensor and the like may be disposed in the recording device 51, and a video signal and the like may be included in transmission data as sensor signals used for learning. The learning data may be a plurality of sensor signals acquired by a plurality of sensors of mutually-different types or may be one sensor signal acquired by one sensor.

The learning device 52 includes an acquisition unit 81, a sensor database 82, a microphone recording database 83, a learning unit 84, and a coefficient database 85.

The acquisition unit 81 acquires transmission data by performing reception of the transmission data transmitted from the recording device 51 or the like and acquires a microphone recording signal, movement information, and position information by appropriately performing a decoding process on the acquired transmission data.

As necessary, the acquisition unit 81 performs signal processing of extracting a sound of a target object sound source on a microphone recording signal and supplies a microphone recording signal set as teacher data (correct answer data) at the time of learning to the microphone recording database 83. This teacher data is an object sound source signal to be generated by the object sound source generator 11.

In addition, the acquisition unit 81 supplies movement information and position information extracted from transmission data to the sensor database 82.

The sensor database 82 records the movement information and the position information supplied from the acquisition unit 81 and appropriately supplies the supplied information to the learning unit 84 as learning data.

The microphone recording database 83 records a microphone recording signal supplied from the acquisition unit 81 and appropriately supplies the recorded microphone recording signal to the learning unit 84 as teacher data.

The learning unit 84 performs machine learning on the basis of the movement information and the position information supplied from the sensor database 82 and a microphone recording signal supplied from the microphone recording database 83, generates an object sound source generator 11, in more detail, coefficient data configuring the object sound source generator 11, and supplies the generated coefficient data to the coefficient database 85. The coefficient database 85 records coefficient data supplied from the learning unit 84.

Although the object sound source generator generated through machine learning may be an object sound source generator 11 illustrated in FIG. 2 or may be an object sound source generator having another configuration such as a DNN, hereinafter, the description will continue by assuming that the object sound source generator 11 is generated.

In such a case, coefficient data formed from coefficients used for an arithmetic operation process (signal processing) of each of the sound source type identifying unit 21, the envelope estimating unit 23, and the mixing unit 24 is generated through machine learning and is supplied to the coefficient database 85.

Although the teacher data at the time of learning may be a microphone recording signal acquired by the microphone 61, the teacher data at the time of learning is assumed as a microphone recording signal (an acoustic signal) in which only a sound of a target object sound source, which is acquired by eliminating a sound other than a target that is an inappropriate voice or the like, that is, an unnecessary sound as a content from the microphone recording signal, is included.

More specifically, in the case of a soccer content, for example, a rustling sound, a collision noise, and the like are eliminated as unnecessary sounds, and a ball kicking sound, a voice, a respiratory sound, a running sound, and the like are extracted as sounds for respective target sound source types, that is, sounds of object sound sources, and an acoustic signal of the extracted sounds is set as teacher data.

In addition, in generating a microphone recording signal serving as teacher data of each sound source type, target sounds and unnecessary sounds may be changed in accordance with each content and situations such as a country that is a contents delivery target and the like and be appropriately set.

In addition, for example, a process of eliminating unnecessary sounds from a microphone recording signal may be realized by a certain process such as sound source separation using a DNN, any other sound source separation, or the like. Furthermore, in the process of eliminating unnecessary sounds from a microphone recording signal, movement information and position information, a microphone recording signal and the like acquired by another recording device 51 may be used.

In addition, the teacher data is not limited to a microphone recording signal and an acoustic signal generated from the microphone recording signal and may be any data such as a general kicking sound generated in advance as long as it is an acoustic signal (a target signal) of a target sound relating to an object (an object sound source) corresponding to the microphone recording signal.

In addition, the learning device 52 may record learning data and teacher data for each person such as for each player or for each performer that is an object and generate coefficient data of the object sound source generator 11 with individuality for each person (each person on whom the recording device 51 is mounted) being also considered. To the contrary, by using learning data and teacher data acquired for a plurality of objects, coefficient data of a general object sound source generator 11 may be generated.

In addition, in a case in which an object sound source generator is configured using a DNN or the like, the DNN may be prepared for each object sound source, and a sensor signal that is an input may be different for each DNN.

<Description of Recording Process at Time of Generating Learning Data>

Subsequently, operations of the recording device 51 and the learning device 52 illustrated in FIG. 3 will be described.

First, a recording process at the time of generating learning data that is performed by the recording device 51 will be described with reference to a flowchart illustrated in FIG. 4.

In Step S11, the microphone 61 receives a sound of surroundings of the recording device 51 and supplies a microphone recording signal acquired as a result thereof to the recording unit 64.

In Step S12, the recording unit 64 acquires sensor signals output from the motion measuring unit 62 and the position measuring unit 63 as movement information and position information.

The recording unit 64 performs AD conversion and the like on the microphone recording signal, the movement information, and the position information acquired in the processes described above as necessary and supplies the microphone recording signal, the movement information, and the position information that have been acquired to the transmission unit 65.

In addition, the transmission unit 65 generates transmission data that is formed from the microphone recording signal, the movement information, and the position information supplied from the recording unit 64. At this time, the transmission unit 65 performs a compression process on the microphone recording signal, the movement information, and the position information as necessary.

In Step S13, the transmission unit 65 transmits the transmission data to the learning device 52, and the recording process ends. In addition, the transmission data may be sequentially transmitted in real time (online) or, after recording, all the transmission data may be transmitted altogether offline.

As described above, the recording device 51 acquires not only the microphone recording signal but also the movement information and the position information and transmits them to the learning device 52. In this way, the learning device 52 can acquire an object sound source generator used for acquiring a microphone recording signal from movement information and position information, and as a result, a target sound having high quality can be acquired.

<Description of Learning Process>

Next, a learning process performed using the learning device 52 will be described with reference to a flowchart illustrated in FIG. 5.

In Step S41, by receiving transmission data transmitted from the recording device 51, the acquisition unit 81 acquires the transmission data. In addition, a decoding process and the like for the acquired transmission data is performed as necessary. Furthermore, the transmission data may be not received via a network but acquired from a removable recording medium or the like.

In Step S42, the acquisition unit 81 performs labeling of the acquired transmission data.

For example, the acquisition unit 81 performs a process of associating each time section of a microphone recording signal, movement information, and position information configuring transmission data with sound source type information, which represents that such a time section is a time section of a sound of an object sound source of a certain sound source type, as a labeling process.

In addition, association between each time section and a sound source type may be manually input by a user or the like, or signal processing such as sound source separation or the like may be performed on the basis of a microphone recording signal, movement information, and position information, and sound source type information may be acquired as a result thereof.

The acquisition unit 81 supplies a microphone recording signal that has been labeled, in other words, with which sound source type information is associated, to the microphone recording database 83, causes the microphone recording signal to be recorded, supplies each sensor signal configuring the movement information and the position information that have been labeled to the sensor database 82, and causes the sensor signal to be recorded.

At the time of learning, each sensor signal configuring the movement information and the position information acquired in this way is used as learning data, and the microphone recording signal is used as teacher data.

In addition, as described above, teacher data may be set as a signal acquired by eliminating unnecessary sounds from a microphone recording signal. In such a case, for example, the acquisition unit 81 performs an arithmetic operation process by inputting a microphone recording signal, movement information, and position information to a DNN acquired in advance through learning, and a microphone recording signal serving as teacher data may be acquired as an output.

In addition, when a microphone recording signal can be acquired as transmission data at the time of using the object sound source generator 11, the microphone recording signal, movement information, and position information configuring the transmission data are set as learning data, and a signal acquired by eliminating unnecessary sounds from the microphone recording signal may be set as teacher data.

In the learning device 52, a large amount of learning data and teacher data acquired at a plurality of different timings are recorded in the sensor database 82 and the microphone recording database 83.

In addition, the learning data and the teacher data may be acquired for the same recording device 51, that is, the same object or may be acquired for a plurality of different recording devices 51 (objects).

Furthermore, as learning data corresponding to teacher data acquired by a predetermined recording device 51, not only movement information and position information acquired by the predetermined recording device 51 but also movement information and position information acquired by another recording device 51, a video signal and the like acquired by a camera and the like other than the recording device 51, and the like may be configured to be used.

In Step S43, the learning unit 84 performs machine learning on the basis of learning data recorded in the sensor database 82 and teacher data recorded in the microphone recording database 83, thereby generating coefficient data configuring the object sound source generator 11.

The learning unit 84 supplies the coefficient data acquired in this way to the coefficient database 85 and causes the coefficient data to be recorded, and the learning process ends.

In this way, the learning device 52 performs machine learning using the transmission data acquired from the recording device 51, thereby generating coefficient data. By configuring as such, a target sound having high quality can be acquired even in a situation in which a microphone recording signal cannot be acquired by using the object sound source generator 11.

Configuration Example of Recording Device and Sound Source Generating Device

Figure 6:
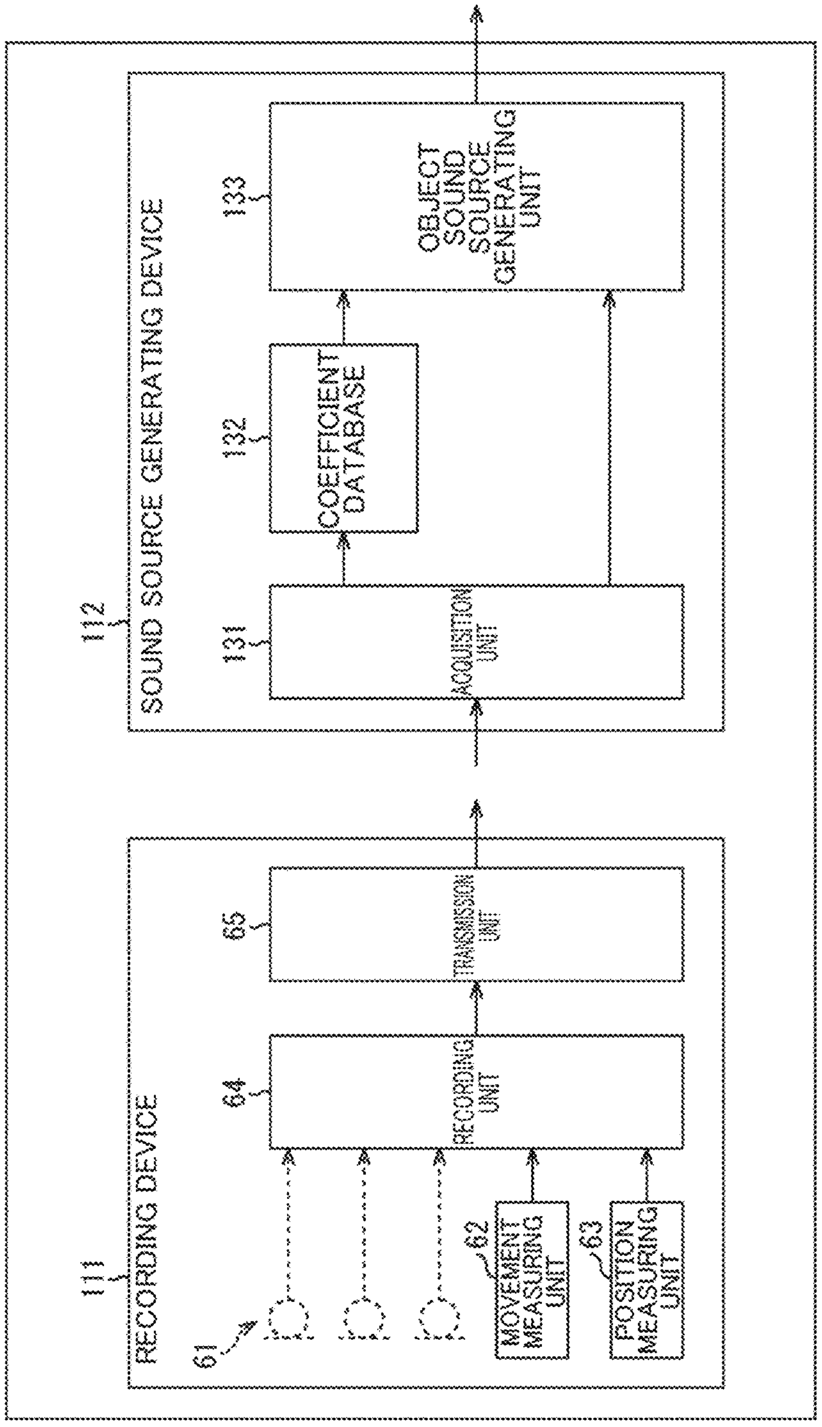
FIG. 6 is a diagram illustrating a configuration example of a recording device and a sound source generating device.

Subsequently, a configuration example of the recording device and the sound source generating device for performing recording of an actual content at the time of a game or at the time of actual performance and generating an object sound source signal of a sound of a target object sound source from a result of the recording is illustrated in FIG. 6. Note that the same reference signs will be applied to parts in FIG. 6 corresponding to those in the case of FIG. 3 and description thereof will be appropriately omitted.

In FIG. 6, a sensor signal acquired by the recording device 111 mounted or built into an object such as a mobile body is transmitted to the sound source generating device 112 as transmission data, and an object sound source signal is generated by the object sound source generator 11.

The recording device 111 includes a motion measuring unit 62, a position measuring unit 63, a recording unit 64, and a transmission unit 65.

The configuration of the recording device 111 is different from the configuration of the recording device 51 in that the microphone 61 is not disposed and is the same configuration as that of the recording device 51 in the other points.

Thus, transmission data transmitted (output) by the transmission unit 65 of the recording device 111 is formed from movement information and position information and does not include a microphone recording signal. In addition, by including an image sensor or the like in the recording device 111, a video signal or the like may be included in transmission data as a sensor signal.

The sound source generating device 112 includes an acquisition unit 131, a coefficient database 132, and an object sound source generating unit 133.

The acquisition unit 131 acquires coefficient data from the learning device 52 via a network or the like, supplies the acquired coefficient data to the coefficient database 132, and causes the coefficient data to be recorded. In addition, coefficient data may be acquired not from the learning device 52 but from another device in a wired manner or a wireless manner or may be acquired from a removable recording medium or the like.

In addition, the acquisition unit 131 receives the transmission data transmitted from the recording device 111 and supplies the received transmission data to the object sound source generating unit 133. In addition, the acquisition unit 131 appropriately performs a decoding process and the like on the received transmission data.

In addition, acquisition of transmission data from the recording device 111 may be performed in real time (online) and may be performed offline after recording. Furthermore, instead of directly receiving transmission data from the recording device 111, data transmission may be acquired from a removable recording medium or the like.

By performing an arithmetic operation process based on coefficient data supplied from the coefficient database 132, the object sound source generating unit 133, for example, functions as the object sound source generator 11 illustrated in FIG. 2.

In other words, the object sound source generating unit 133 generates an object sound source signal on the basis of coefficient data supplied from the coefficient database 132 and transmission data supplied from the acquisition unit 131 and outputs the generated object sound source signal to a later stage.

<Description of Recording Process Performed at the Time of Generating Object Sound Source>

Subsequently, operations of the recording device 111 and the sound source generating device 112 performed at the time of recording contents, in other words, at the time of generating an object sound source signal will be described.

Figure 7:
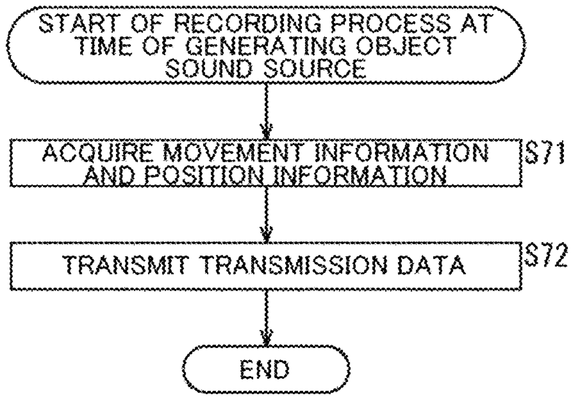
FIG. 7 is a flowchart for explaining a recording process performed at the time of generating an object sound source.

First, a recording process at the time of generating an object sound source that is performed by the recording device 111 will be described with reference to a flowchart illustrated in FIG. 7.

Figure 4:
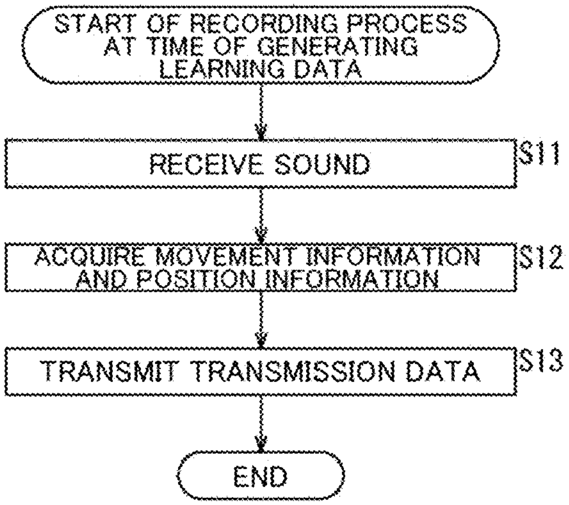
FIG. 4 is a flowchart for explaining a recording process performed at the time of generating learning data.

When the recording process starts, although movement information and position information are acquired in Step S71, and transmission data is transmitted in Step S72, such processes are similar to the processes of Steps S12 and S13 illustrated in FIG. 4, and thus description thereof will be omitted.

Here, in transmission data transmitted in Step S72, only movement information and position information are included, and a microphone recording signal is not included.

When the transmission data is transmitted in this way, the recording process ends.

The recording device 111 acquires movement information and position information as described above and transmits the acquired information to the sound source generating device 112. In this way, the sound source generating device 112 can acquire an object sound source signal corresponding to the microphone recording signal from the movement information and the position information. In other words, a target sound having high quality can be acquired.

<Description of Sound Source Generating Process>

Subsequently, a sound source generating process performed using the sound source generating device 112 will be described with reference to a flowchart illustrated in FIG. 8.

In addition, at a time point at which the sound source generating process starts, it is assumed that a state in which coefficient data is acquired in advance and is recorded in the coefficient database 132 is formed.

In Step S101, by receiving transmission data transmitted from the recording device 111, the acquisition unit 131 acquires the transmission data and supplies the transmission data to the object sound source generating unit 133. In addition, a decoding process and the like are performed as necessary for the acquired transmission data.

In Step S102, the object sound source generating unit 133 generates an object sound source signal on the basis of the coefficient data supplied from the coefficient database 132 and the transmission data supplied from the acquisition unit 131.

For example, the object sound source generating unit 133 functions as an object sound source generator 11 acquired in advance through learning by using the coefficient data acquired from the coefficient database 132.

In such a case, the sound source type identifying unit 21 performs an arithmetic operation based on a plurality of sensor signals as movement information and position information configuring transmission data supplied from the acquisition unit 131 and coefficients acquired in advance through learning and supplies sound source type information acquired as a result thereof to the sound source database 22.

The sound source database 22 supplies one or a plurality of dry source signals of a sound source type represented by the sound source type information supplied from the sound source type identifying unit 21 among stored dry source signals of respective sound source types to the mixing unit 24.

The envelope estimating unit 23 extracts an envelope of a sensor signal of an acceleration sensor included in movement information configuring transmission data supplied from the acquisition unit 131 and supplies envelope information representing the extracted envelope to the mixing unit 24.

The mixing unit 24 performs signal processing such as a modulation process and filtering for one or a plurality of dry source signals supplied from the sound source database 22 on the basis of the envelope information supplied from the envelope estimating unit 23, thereby generating an object sound source signal.

In addition, the object sound source generating unit 133 may also generate metadata of each object sound source signal simultaneously with generating an object sound source signal of each object sound source.

In such a case, for example, the object sound source generating unit 133 generates metadata including sound source type information acquired by the sound source type identifying unit 21, movement information and position information acquired as transmission data, and the like on the basis of the transmission data.

In Step S103, the object sound source generating unit 133 outputs the generated object sound source signal, and the sound source generating process ends. At this time, meta data may be configured to be output together with the object sound source signal.

As described above, the sound source generating device 112 generates an object sound source signal on the basis of the coefficient data and the transmission data and outputs the object sound source signal.

In this way, even in a case in which a microphone recording signal cannot be acquired by the recording device 111, a target sound having high quality, that is, an object sound source signal having high quality can be acquired from sensor signals of other sensors other than the microphone.

In other words, an object sound source signal of a target object sound source can be robustly acquired from sensor signals of sensors of a small number of types. In addition, an object sound source signal, in which only a target sound is included, not including sounds such as noise, a voice, and the like not desired to be reproduced can be acquired.

Second Embodiment

Configuration Example of Learning Device

As described above, teacher data used for learning of the object sound source generator 11 may be set as a signal acquired by eliminating unnecessary sounds from a microphone recording signal, that is, a signal acquired by extracting only a target sound. In addition, in generating teacher data, movement information and position information may be also used in addition to a microphone recording signal.

Figure 9:
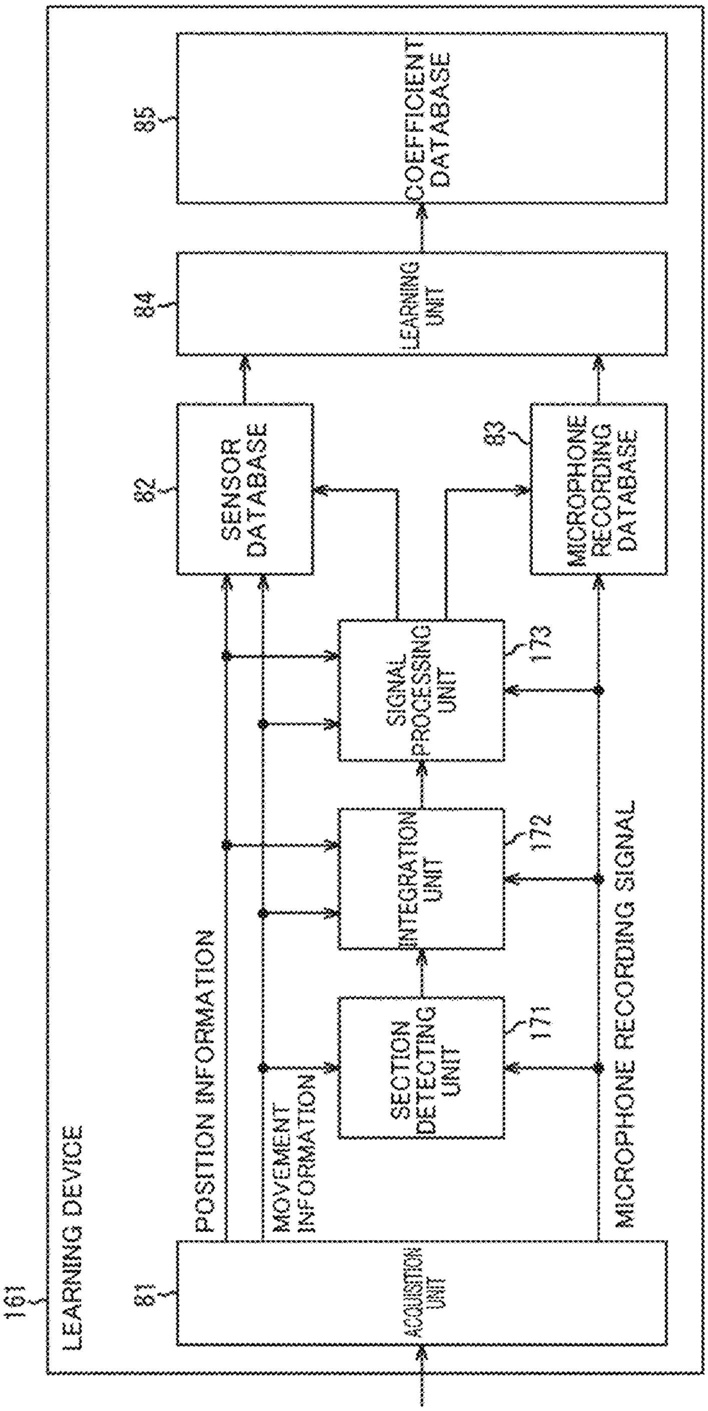
FIG. 9 is a diagram illustrating a configuration example of a learning device.

For example, in a case in which movement information and position information are also used in generating teacher data, the learning device is configured as illustrated in FIG. 9. Note that the same reference signs will be applied to parts in FIG. 9 corresponding to those in the case of FIG. 3 and description thereof will be appropriately omitted.

The learning device 161 illustrated in FIG. 9 includes an acquisition unit 81, a section detecting unit 171, an integration unit 172, a signal processing unit 173, a sensor database 82, a microphone recording database 83, a learning unit 84, and a coefficient database 85.

The configuration of the learning device 161 is different from that of the learning device 52 in that the section detecting unit 171 to the signal processing unit 173 are newly disposed and is similar to the configuration of the learning device 52 in the other points.

When transmission data is acquired, the acquisition unit 81 supplies a microphone recording signal configuring the transmission data to the section detecting unit 171, the integration unit 172, the signal processing unit 173, and the microphone recording database 83.

In addition, the acquisition unit 81 supplies movement information configuring the transmission data to the section detecting unit 171, the integration unit 172, the signal processing unit 173, and the sensor database 82 and supplies position information configuring the transmission data to the integration unit 172, the signal processing unit 173, and the sensor database 82.

The section detecting unit 171 detects a time section in which a type of a sound of an object sound source included in a microphone recording signal and the sound of the object sound source are included on the basis of the microphone recording signal and movement information supplied from the acquisition unit 81 and supplies sound source type section information representing a result of the detection to the integration unit 172.

For example, by performing a threshold process on a microphone recording signal, performing an arithmetic operation by substituting a microphone recording signal and movement information in an identifying unit such as a DNN, or performing Delay and Sum beamforming (DS) or Null Beamformer (NBF) on a microphone recording signal, the section detecting unit 171 identifies a type of an object sound source of a sound included in each time section and generates sound source type section information.

As a specific example, when a sensor signal representing a minute displacement of an object in a vertical direction, which has been measured, for example, by an acceleration sensor, is used as movement information, a time section of a respiratory sound of a person who is the object can be detected. In this case, for example, a time section in which a frequency of a sensor signal is about 0.5 Hz to 1 Hz is regarded as a time section of a respiratory sound of the object.

In addition, for example, by using NBF, a component of a spoken voice of an object included in a microphone recording signal can be suppressed. In this case, in a time section of a spoken voice of an object detected from a microphone recording signal before suppression, a time section in which a spoken voice of the object has not been detected from the microphone recording signal after suppression is regarded as a final time section of the spoken voice of the object.

The integration unit 172 generates final sound source type section information and sound source type information on the basis of a microphone recording signal, movement information, and position information supplied from the acquisition unit 81 and sound source type section information supplied from the section detecting unit 171 and supplies the generated information to the signal processing unit 173.

Particularly, the integration unit 172 generates sound source type section information of a target object on the basis of the microphone recording signal, the movement information, and the position information of an object that is a processing target (hereinafter, also referred to as a target object) and at least one of a microphone recording signal, movement information, and position information of another object.

In this case, the integration unit 172, for example, performs a position information comparison process, a time section integration process, and a section smoothing process, whereby final sound source type section information is generated.

In the position information comparison process, a distance between a target object and another object is calculated on the basis of position information of each object, and another object on which there may be an influence of a sound of an object sound source of the target object, that is, another object present near the target object, is selected as a reference object on the basis of the acquired distance.

Next, in the time section integration process, it is determined whether or not there is an object selected as the reference object.

Then, in a case in which there is no object selected as the reference object, sound source type section information of the target object acquired by the section detecting unit 171 is directly output to the signal processing unit 173 as final sound source type section information. The reason for this is that, in a case in which another object is not present near the target object, a sound of the other object is not mixed into the microphone recording signal.

On the other hand, in a case in which there is an object selected as the reference object, final sound source type section information of the target object is generated also using position information and movement information of such a reference object.

More specifically, a reference object having a section overlapping a time section represented by the sound source type section information of the target object as a time section of a sound of the object sound source among reference objects is selected as a final reference object.

Then, relative azimuth information representing a relative direction of a reference object seen from the target object in a three-dimensional space is generated on the basis of the position information and the movement information of the reference object and the position information and the movement information of the target object.

In addition, an NBF filter is formed on the basis of a direction of the target object that is represented by the position information and the movement information of the target object and relative azimuth information of each reference object. Furthermore, a convolution process of the NBF filter and the time section represented by the sound source type section information of the target object in the microphone recording signal of the target object is performed.

Thereafter, by using a process similar to the process performed by the section detecting unit 171 on the basis of a signal acquired through the convolution process and the movement information of the target object, sound source type section information is generated. In this way, a sound emitted from a reference object is suppressed, and sound source type section information of higher accuracy can be acquired.

Finally, by performing a section smoothing process on the sound source type section information acquired through the time section integration process, final sound source type section information is acquired.

For example, for each type of object sound source, when a sound of an object sound source of the type is generated, an average time in which the sound minimally continues is acquired as an average minimum continuation time in advance.

In the section smoothing process, smoothing is performed using a smoothing filter that connects time sections of sounds of an object sound source that are finely divided (divided) such that a length of a time section in which a sound of an object sound source has been detected becomes equal to or longer than the average minimum continuation time.

In addition, the integration unit 172 generates sound source type information from the acquired sound source type section information and supplies the sound source type section information and the sound source type information to the signal processing unit 173.

As described above, the integration unit 172 can eliminate information about a sound of another object that has not been eliminated (excluded) in the sound source type section information acquired by the section detecting unit 171 and acquire sound source type section information of higher accuracy.

The signal processing unit 173 performs signal processing on the basis of microphone recording signal, movement information, and position information supplied from the acquisition unit 81 and sound source type section information supplied from the integration unit 172, thereby generating an object sound source signal serving as teacher data.

For example, the signal processing unit 173 performs a sound quality correction process, a sound source separation process, a noise elimination process, a distance correction process, a sound source replacement process, or a process acquired by combining a plurality of such processes as signal processing.

More specifically, for example, a process of suppressing noise such as a filter process or gain correction for suppressing a frequency band in which noise is dominant, a process of muting a section having much noise or an unnecessary section, a filter process of increasing a frequency component that may easily attenuate, and the like are performed as the sound quality correction process.

For example, a process that identifies a time section in which sounds of a plurality of object sound sources are included in a microphone recording signal on the basis of the sound source type section information and is based on an independent component analysis separating a sound of each object sound source in accordance with a difference between amplitude values or probability density distributions for respective types of object sound source on the basis of a result of the identification is performed as a sound source separation process.

In addition, for example, in a microphone recording signal, when unnecessary sounds such as steady noises that are mainly a background sound, a glad shout, and the like and noises of a wind and the like are included in a time section of a sound of an object sound source, a process of suppressing a noise in the time section is performed as a noise elimination process.

In addition, for example, for an absolute sound pressure of a sound emitted by an object sound source, a process of correcting distance attenuation from an object sound source to a position of a microphone 61 at the time of recording and an influence of convolution of transfer characteristics is performed as a distance correction process.

In this case, for example, in a distance correction process, a process of adding inverse characteristics of transfer characteristics from an object sound source to the microphone 61 to a microphone recording signal is performed. In this way, sound quality deterioration of a sound of an object sound source according to distance attenuation, transfer characteristics, and the like can be corrected.

In addition, for example, a process of replacing a section of a part of a microphone recording signal with another acoustic signal that is prepared in advance or is dynamically generated on the basis of sound source type section information is performed as a sound source replacement process.

The signal processing unit 173 supplies an object sound source signal serving as teacher data acquired as described above and sound source type information supplied from the integration unit 172 to the microphone recording database 83 in association with each other.

In addition, the signal processing unit 173 supplies the sound source type information supplied from the integration unit 172 to the sensor database 82 and causes the sound source type information, the movement information, and the position information to be recorded in association with each other.

In the learning device 161, sound source type information is generated, and, an object sound source signal serving as teacher data, and movement information and position information serving as learning data are associated with the sound source type information, and thus a user or the like does not need to perform an operation input for the labeling process described above.

In addition, the microphone recording database 83 can supply an object sound source signal supplied from the signal processing unit 173 to the learning unit 84 as teacher data and supply a microphone recording signal supplied from the acquisition unit 81 to the learning unit 84 as teacher data. Furthermore, the microphone recording signal may be used as learning data.

<Description of Learning Processing>

Figure 10:
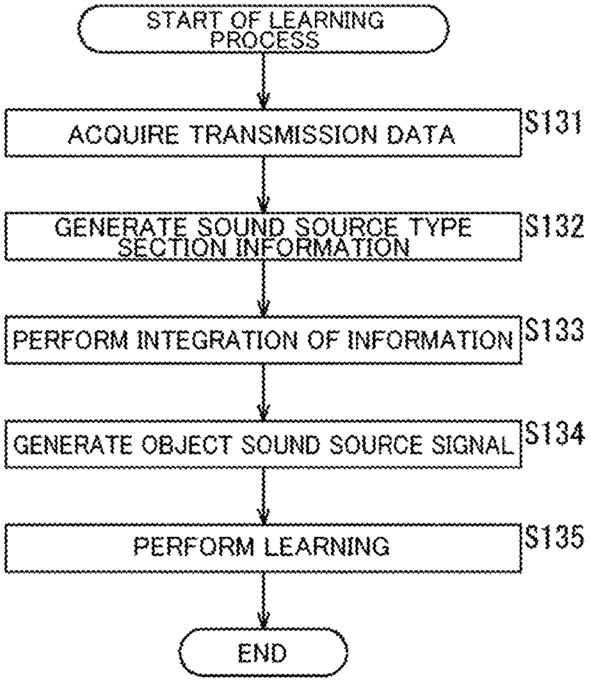
FIG. 10 is a flowchart for explaining learning processing.

Next, a learning process performed using the learning device 161 will be described with reference to a flowchart illustrated in FIG. 10.

In Step S131, the acquisition unit 81 acquires transmission data from the recording device 111.

The acquisition unit 81 supplies a microphone recording signal configuring transmission data to the section detecting unit 171, the integration unit 172, the signal processing unit 173, and the microphone recording database 83.

In addition, the acquisition unit 81 supplies movement information configuring the transmission data to the section detecting unit 171, the integration unit 172, the signal processing unit 173, and the sensor database 82 and supplies position information configuring the transmission data to the integration unit 172, the signal processing unit 173, and the sensor database 82.

In Step S132, the section detecting unit 171 generates sound source type section information on the basis of the microphone recording signal and the movement information supplied from the acquisition unit 81 and supplies the generated sound source type section information to the integration unit 172.

For example, the section detecting unit 171 performs a threshold process for a microphone recording signal, an arithmetic operation process based on an identifying unit such as a DNN or the like, and the like, thereby identifying a type of an object sound source of a sound included in each time section and generating sound source type section information.

In Step S133, the integration unit 172 generates final sound source type section information and sound source type information by performing integration of information on the basis of the microphone recording signal, the movement information, and the position information supplied from the acquisition unit 81 and the sound source type section information supplied from the section detecting unit 171 and supplies the sound source type section information and the sound source type information that have been generated to the signal processing unit 173.

For example, in Step S133, the position information comparison process, the time section integration process, and the section smoothing process described above are performed to integrate information, whereby final sound source type section information is generated.

In Step S134, the signal processing unit 173 performs signal processing on the basis of the microphone recording signal, the movement information, and the position information supplied from the acquisition unit 81 and the sound source type section information supplied from the integration unit 172 and generates an object sound source signal serving as teacher data.

For example, the signal processing unit 173 performs a sound quality correction process, a sound source separation process, a noise elimination process, a distance correction process, or a sound source exchange process or a process acquired by combining a plurality of such processes as signal processing and generates an object sound source signal.

The signal processing unit 173 supplies an object sound source signal serving as teacher data and sound source type information supplied from the integration unit 172 to the microphone recording database 83 in association with each other and causes them to be recorded therein. In addition, the signal processing unit 173 supplies sound source type information supplied from the integration unit 172 to the sensor database 82 and causes the sound source type information, movement information, and position information to be recorded therein in association with each other.

In Step S135, the learning unit 84 performs machine learning on the basis of movement information and position information serving as learning data, which are recorded in the sensor database 82, and an object sound source signal serving as teacher data which is recorded in the microphone recording database 83.

The learning unit 84 supplies coefficient data acquired through machine learning to the coefficient database 85 and causes the coefficient data to be recorded therein, and the learning process ends.

As described above, the learning device 161 generates teacher data using transmission data acquired from the recording device 51 and performs machine learning, thereby generating coefficient data. In this way, also in a situation in which a microphone recording signal cannot be acquired, a target sound having high quality can be acquired using the object sound source generator 11.

Third Embodiment

Configuration Example of Learning Device

However, in acquiring an object sound source signal of a targeted object sound source of a target object, there are cases in which a microphone recording signal of a sound of the object sound source can be acquired although it has not a high SN ratio.

As such cases, for example, a case in which a microphone recording signal can be acquired by a recording device 111 that is mounted on another object different from a target object such as another player other than the target player, a judge, or the like, a case in which a voice is recorded using a separate microphone in synchronization with the recording device 111, and the like may be considered. In addition, a case in which a microphone of a recording device 111, which has a high priority level, mounted in a target object is out of order, and a microphone recording signal cannot be acquired may be also considered.

Thus, an object sound source signal of a target object sound source of a target object may be configured to be generated by also using a microphone recording signal acquired by a recording device 111 mounted in another object different from the target object.

Figure 11:
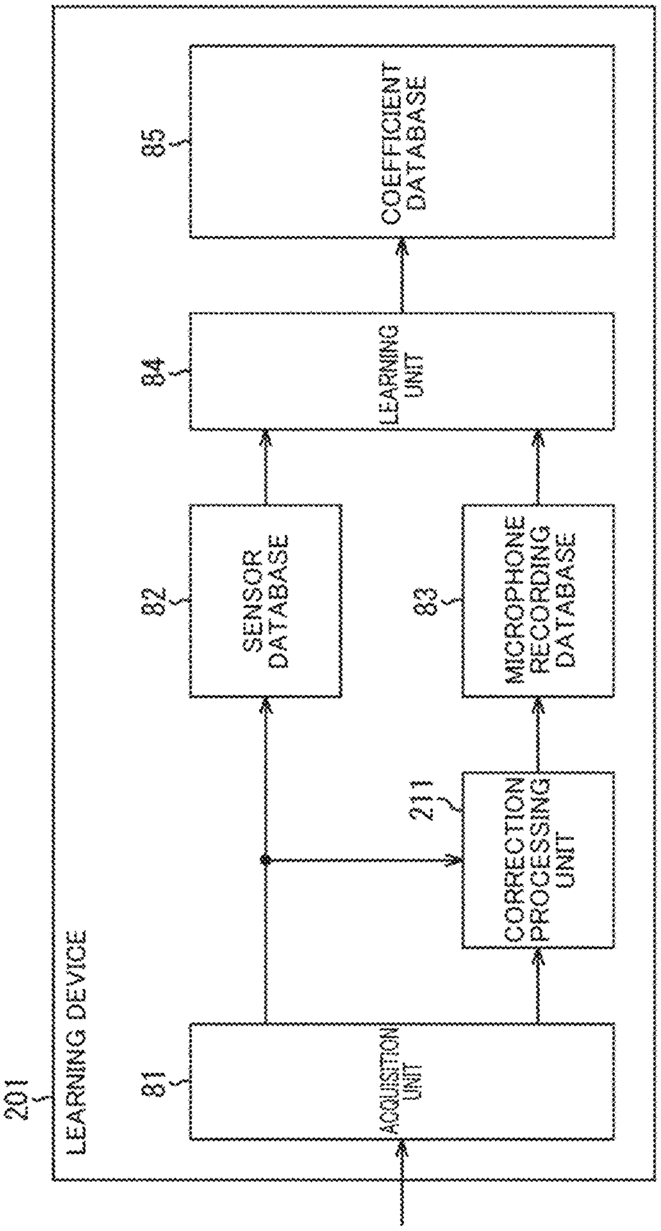
FIG. 11 is a diagram illustrating a configuration example of a learning device.

In such a case, for example, a learning device is configured as illustrated in FIG. 11. Note that in FIG. 11, parts corresponding to those in FIG. 3 are indicated by the same reference signs, and description of those parts will be omitted as appropriate.

A learning device 201 illustrated in FIG. 11 includes an acquisition unit 81, a correction processing unit 211, a sensor database 82, a microphone recording database 83, a learning unit 84, and a coefficient database 85. The configuration of the learning device 201 is a configuration in which the correction processing unit 211 is newly disposed in the configuration of the learning device 52.

In this example, the correction processing unit 211 supplies a microphone recording signal, which has been supplied from the acquisition unit 81, acquired by a target recording device 51 to the microphone recording database 83 as teacher data.

In addition, position information acquired by a target recording device 51 and position information and a microphone recording signal acquired by another recording device 51 are supplied to the correction processing unit 211.

Here, an example in which position information and a microphone recording signal acquired by another recording device 51 are used will be described. However, the configuration is not limited thereto, and position information and a microphone recording signal used by the correction processing unit 211 may be position information of a microphone that is not mounted on a target object and a microphone recording signal acquired by the microphone.

The correction processing unit 211 performs a correction process on a microphone recording signal of another recording device 51 on the basis of position information of the target recording device 51 and position information of the other recording device 51 and supplies a microphone recording signal acquired as a result thereof to the microphone recording database 83 as learning data for the target recording device 51 and causes the microphone recording signal to be recorded therein.

In a correction process, a process according to a positional relation between a target recording device 51 and another recording device 51 is performed.

More specifically, for example, in the correction process, a process of shifting a microphone recording signal in the time direction such as propagation delay compensation for a microphone recording signal in accordance with a distance from a target recording device 51 to another recording device 51 that is acquired from position information or the like is performed.

In addition, correction relating to transfer characteristics for sounds according to a relative orientation (direction) of another object seen from a target object may be performed on the basis of movement information of a target recording device 51 and movement information of another recording device 51 as a correction process.

The learning unit 84 performs machine learning having position information and movement information of a target recording device 51 and a microphone recording signal after a correction process of another recording device 51 as learning data and having a microphone recording signal acquired by the target recording device 51 as teacher data.

In other words, coefficient data configuring an object sound source generator 11 having position information, movement information, and a microphone recording signal after a correction process, which are learning data, as inputs and having a microphone recording signal serving as teacher data as an output is generated through machine learning.

In addition, in this case, the number of the other recording devices 51 may be one or two or more. Furthermore, the movement information and the position information acquired by the other recording device 51 may be used also as learning data for the target object (the recording device 51).

In addition, teacher data for a target object may be configured to be generated on the basis of a microphone recording signal after a correction process of another recording device 51.

<Description of Learning Process>

Next, a learning process performed using the learning device 201 will be described with reference to a flowchart illustrated in FIG. 12.

Figure 5:
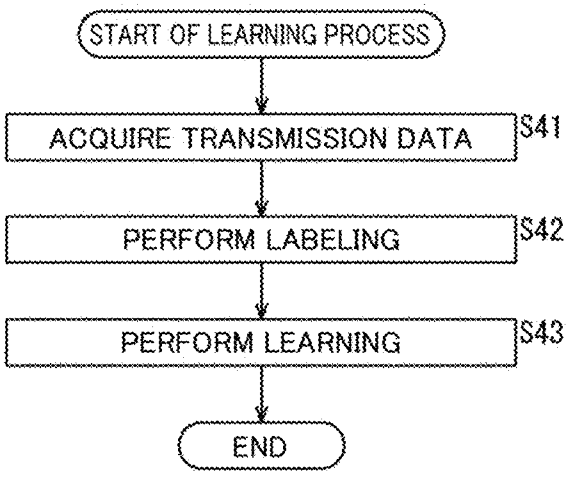
FIG. 5 is a flowchart for explaining learning processing.

Note that the processes of Steps S161 and S162 are the same as the processes of Steps S41 and S42 in FIG. 5, and thus description thereof will be omitted.

Here, in Step S162, movement information and position information that have been labeled are supplied to the sensor database 82, and the position information is supplied to the correction processing unit 211. In addition, a microphone recording signal that has been labeled is supplied to the correction processing unit 211.

The correction processing unit 211 directly supplies a labeled microphone recording signal of a target recording device 51, which has been supplied from the acquisition unit 81, to the microphone recording database 83 as teacher data and causes the microphone recording signal to be recorded therein.

In Step S163, the correction processing unit 211 performs a correction process on a microphone recording signal of another recording device 51 supplied from the acquisition unit 81 on the basis of the position information of the target recording device 51 and the position information of the other recording device 51 supplied from the acquisition unit 81.

The correction processing unit 211 supplies the microphone recording signal acquired using the correction process to the microphone recording database 83 as learning data for the target recording device 51 and causes the microphone recording signal to be recorded therein.

When the correction process is performed, thereafter, learning is performed in Step S164, and the learning process ends, and the process of Step S164 is similar to the process of Step S43 illustrated in FIG. 5, and thus description thereof will be omitted.

Here, in Step S164, machine learning is performed using not only position information and movement information of a target recording device 51 but also a microphone recording signal after a correction process of another recording device 51 as learning data.

As described above, the learning device 201 performs machine learning also using a microphone recording signal of another recording device 51 for which the correction process has been performed as learning data and generates coefficient data.

In this way, also in a situation in which a microphone recording signal cannot be acquired, a target sound having high quality can be acquired using the object sound source generator 11. Particularly, in this example, since a microphone recording signal acquired by another recording device can be used as an input of the object sound source generator 11, a target sound having higher quality can be acquired.

Configuration Example of Sound Source Generating Device

Figure 13:
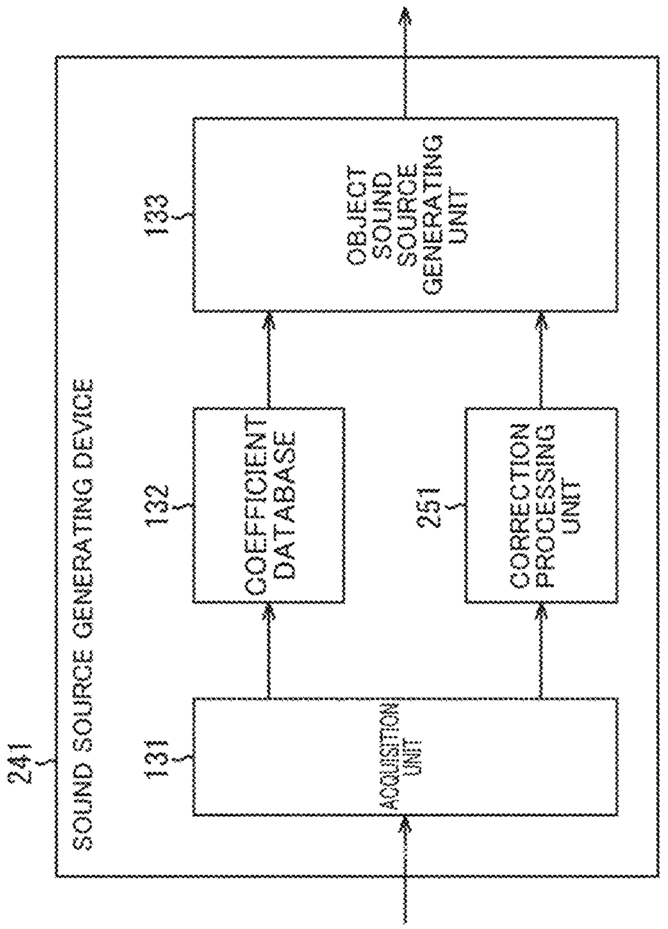
FIG. 13 is a diagram illustrating a configuration example of a sound source generating device.

In addition, for example, the sound source generating device generating an object sound source signal using coefficient data acquired by the learning device 201 is configured as illustrated in FIG. 13. Note that the same reference signs will be applied to parts in FIG. 13 corresponding to the case in FIG. 6 and description thereof will be appropriately omitted.

The sound source generating device 241 illustrated in FIG. 13 includes an acquisition unit 131, a coefficient database 132, a correction processing unit 251, and an object sound source generating unit 133.

The configuration of the sound source generating device 241 is a configuration in which the correction processing unit 251 is newly disposed in the configuration of the sound source generating device 112.

The acquisition unit 131 of the sound source generating device 241 acquires not only transmission data from the target recording device 111 but also transmission data from another recording device 111. In this case, a microphone 61 is disposed in the other recording device 111, and a microphone recording signal is also included in the transmission data from the other recording device 111.

The correction processing unit 251 does not perform a correction process on transmission data, which is supplied from the acquisition unit 131, acquired from the target recording device 111 and directly supplies the supplied transmission data to the object sound source generating unit 133.

On the other hand, the correction processing unit 251 performs a correction process on a microphone recording signal included in transmission data, which has been acquired from another recording device 111, supplied from the acquisition unit 131 and supplies a microphone recording signal after the correction process to the object sound source generating unit 133. In addition, similar to a case of the correction processing unit 211, position information and a microphone recording signal used by the correction processing unit 251 may be position information of a microphone that is not mounted on a target object and a microphone recording signal acquired by the microphone.

<Description of Sound Source Generation Process>

Figure 14:
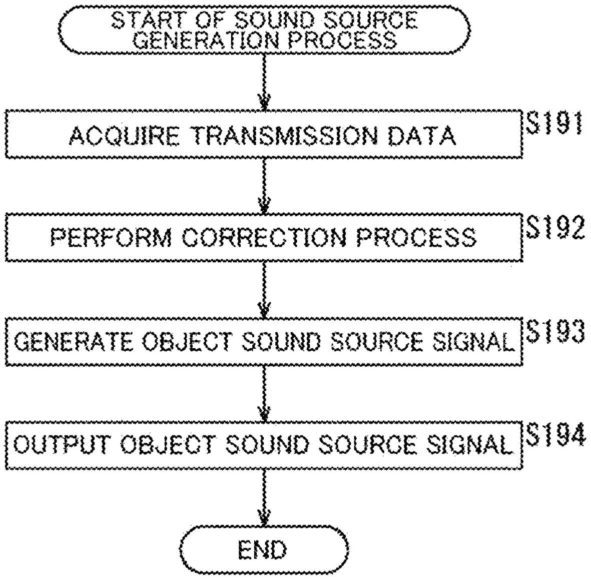
FIG. 14 is a flowchart for explaining a sound source generating process.

Subsequently, a sound source generation process performed using the sound source generating device 241 will be described with reference to a flowchart illustrated in FIG. 14.

Figure 8:
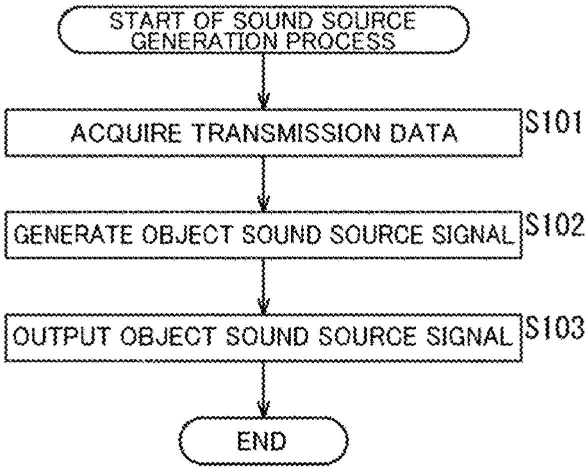
FIG. 8 is a flowchart for explaining a sound source generating process.

A process of Step S191 is similar to the process of Step S101 illustrated in FIG. 8, and thus description thereof will be omitted.

At this time, the correction processing unit 251 directly supplies transmission data of the target recording device 111 out of transmission data supplied from the acquisition unit 131 to the object sound source generating unit 133.

In Step S192, the correction processing unit 251 performs a correction process on a microphone recording signal included in transmission data, acquired from another recording device 111, supplied from the acquisition unit 131 and supplies a microphone recording signal after the correction process to the object sound source generating unit 133.

Figure 12:
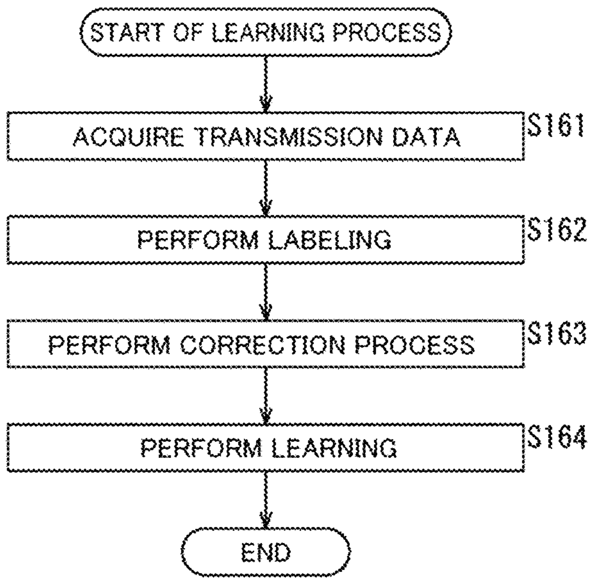
FIG. 12 is a flowchart for explaining learning processing.

For example, in Step S192, on the basis of position information of the target recording device 111 and position information of another recording device 111, a correction process similar to that of the case of Step S163 illustrated in FIG. 12 is performed.

When the correction process ends, thereafter, processes of Step S193 and Step S194 are performed, and the sound source generation process ends. Such processes are similar to the processes of Step S102 and Step S103 illustrated in FIG. 8, and thus description thereof will be omitted.

Here, in Step S193, for example, not only position information and movement information of the target recording device 111 but also a microphone recording signal after a correction process supplied from the correction processing unit 251 are input to the sound source type identifying unit 21 of the object sound source generator 11, and an arithmetic operation is performed.

In other words, the object sound source generating unit 133 generates an object sound source signal corresponding to a microphone recording signal of a target recording device 111 on the basis of position information and movement information of the target recording device 111 and a microphone recording signal after a correction process of another recording device 111, and coefficient data.

As described above, the sound source generating device 241 generates an object sound source signal also using a microphone recording signal of another recording device 111 for which a correction process has been performed and outputs the generated object sound source signal.

In this way, even in a case in which a microphone recording signal cannot be acquired by a target recording device 111, a target sound having high quality, that is, an object sound source signal having high quality, can be acquired using a microphone recording signal acquired by another recording device 111.

In addition, for example, also in a case in which only a microphone recording signal having a low SN ratio can be acquired by a target recording device 111 or the like, an object sound source signal may be configured to be generated by the sound source generating device 241 using a microphone recording signal acquired by another recording device 111. In such a case, an object sound source signal having a higher SN ratio, that is, higher quality, can be acquired.

Fourth Embodiment

<Description of Learning Process>

For example, in content recording under a difficult environment of sports or the like, a case in which some sensor signals used for generation of an object sound source signal is not acquired for any reason such as a malfunction of sensors of the motion measuring unit 62, the position measuring unit 63, and the like installed in the recording device 111 may be also considered.

Thus, in a case in which an object sound source signal is actually generated, on the premise that some sensor signals among a plurality of sensor signals cannot be acquired (are deficient), an object sound source signal may be configured to be able to be acquired using sensor signals, which can be acquired, among the plurality of sensor signals.

In such a case, for all the combinations of a plurality of sensor signals that can be acquired, an object sound source generator 11 having such sensor signals as inputs and having an object sound source signal as an output may be learned in advance. In that case, although there is a possibility of estimation accuracy being lowered, an object sound source signal can be acquired only from some of sensor signals.

For example, when sensor signals of a maximum N types can be acquired, an object sound source generator 11 of $\Sigma_{n=1}^{N} {}_{N}C_{n}$ may be learned in advance.

In addition, there are cases in which it is not practical to prepare an object sound source generator 11 for all types (combinations) of sensor signals, that is, all deficient patterns. In such cases, learning is performed only for a pattern in which a sensor signal having a high frequency of malfunctioning is deficient, and, for a pattern in which a sensor signal having a low frequency is deficient, an object sound source generator 11 may not be prepared, or an object sound source generator 11 having a simpler configuration may be prepared.

Figure 15:
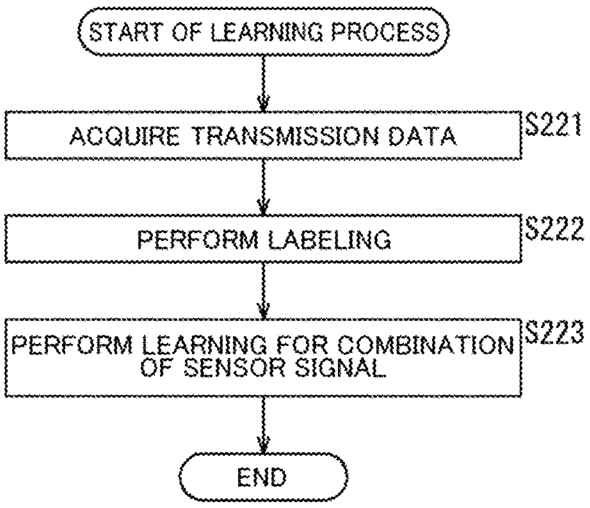
FIG. 15 is a flowchart for explaining learning processing.

In this way, in a case in which an object sound source generator 11, that is, coefficient data, is prepared for a combination of sensor signals, the learning device 52 performs a learning process illustrated in FIG. 15.

Hereinafter, the learning process performed using the learning device 52 will be described with reference to a flowchart illustrated in FIG. 15. Note that the processes of Steps S221 and S222 are the same as the processes of Steps S41 and S42 in FIG. 5, and thus description thereof will be omitted.

In Step S223, the learning unit 84 performs machine learning for a combination of a plurality of sensor signals configuring learning data on the basis of learning data recorded in the sensor database 82 and teacher data recorded in the microphone recording database 83.

In other words, in machine learning for a combination, coefficient data of an object sound source generator 11 having sensor signals of a predetermined combination that are learning data as inputs and having a microphone recording signal that is teacher data as an output is generated.

Also in this example, a microphone recording signal acquired by a target recording device 51 and a microphone recording signal acquired by another recording device 51 may be also used as learning data.

The learning unit 84 supplies coefficient data configuring the object sound source generator 11 that is acquired by combining sensor signals to the coefficient database 85 and causes the coefficient data to be recorded therein, and the learning process ends.

As described above, the learning device 52 performs machine learning for a combination of a plurality of sensor signals and generates coefficient data configuring an object sound source generator 11 in such a combination. In this way, even in a case in which some of sensor signals cannot be acquired, an object sound source signal can be robustly generated from acquired sensor signals.

Configuration Example of Sound Source Generating Device

Figure 16:
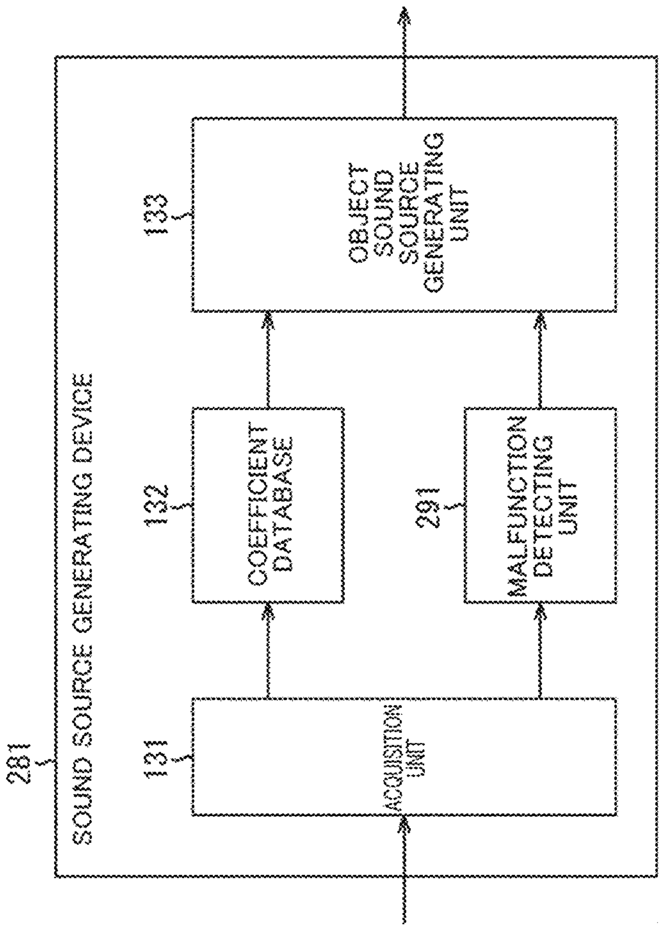
FIG. 16 is a diagram illustrating a configuration example of a sound source generating device.

In addition, in a case in which coefficient data is generated for a combination of sensor signals, for example, a sound source generating device is configured as illustrated in FIG. 16. Note that the same reference signs will be applied to parts in FIG. 16 corresponding to the case in FIG. 6 and description thereof will be appropriately omitted.

The sound source generating device 281 illustrated in FIG. 16 includes an acquisition unit 131, a coefficient database 132, a malfunction detecting unit 291, and an object sound source generating unit 133.

The configuration of the sound source generating device 281 is a configuration in which the malfunction detecting unit 291 is newly disposed in the configuration of the sound source generating device 112.

The malfunction detecting unit 291, for each sensor signal configuring transmission data supplied from the acquisition unit 131, on the basis of a sensor signal, detects a malfunction (defect) of a sensor that has acquired the sensor signal and supplies a result of the detection to the object sound source generating unit 133.

In addition, the malfunction detecting unit 291 supplies only a sensor signal of a sensor that is not out of order and is normally operating among sensor signals configuring transmission data supplied from the acquisition unit 131, in other words, included in the transmission data to the object sound source generating unit 133 in accordance with a result of detection of malfunctioning.

In addition, coefficient data generated for a combination of sensor signals is recorded in the coefficient database 132.

The object sound source generating unit 133 reads coefficient data of the object sound source generator 11 having a sensor signal that is not out of order as an input and having an object sound source signal as an output from the coefficient database 132 on the basis of a result of detection of a malfunction supplied from the malfunction detecting unit 291.

Then, the object sound source generating unit 133 generates an object sound source signal of a target object sound source on the basis of the read coefficient data and sensor signals of sensor, which are not out of order, supplied from the malfunction detecting unit 291.

In addition, in this example, a microphone recording signal may be included as a sensor signal in transmission data acquired by the acquisition unit 131 from the target recording device 111.

In such a case, for example, in a case in which a malfunction of a microphone corresponding to the microphone recording signal has not been detected by the malfunction detecting unit 291, the object sound source generating unit 133 can output the microphone recording signal as it is or a signal generated from the microphone recording signal as an object sound source signal.

On the other hand, in a case in which a malfunction of a microphone has been detected, the object sound source generating unit 133 can generate an object sound source signal on the basis of sensor signals of sensors, of which a malfunction has not been detected, other than the microphone recording signal.

<Description of Sound Source Generation Process>

Figure 17:
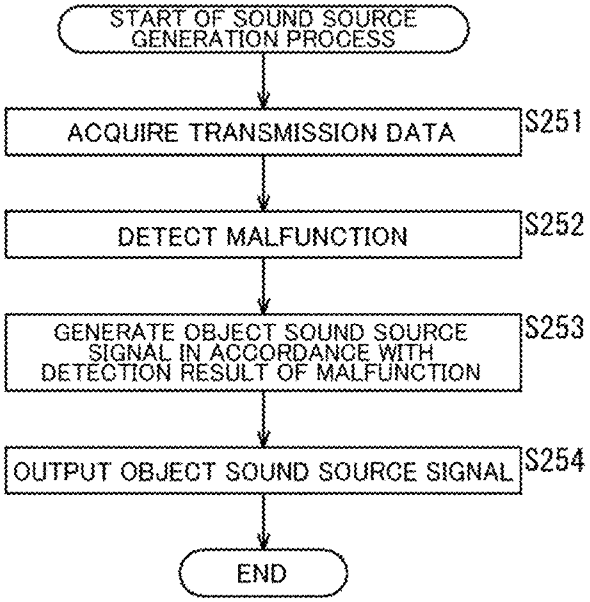
FIG. 17 is a flowchart for explaining a sound source generating process.

Subsequently, a sound source generation process performed using the sound source generating device 281 will be described with reference to a flowchart illustrated in FIG. 17.

A process of Step S251 is similar to the process of Step S101 illustrated in FIG. 8, and thus description thereof will be omitted.

In Step S252, the malfunction detecting unit 291 detects a malfunction of a sensor for each sensor signal configuring transmission data supplied from the acquisition unit 131 and supplies detection results to the object sound source generating unit 133.

For example, the malfunction detecting unit 291 performs pure-zero checking or detection of an abnormal value for a sensor signal or uses a DNN having a sensor signal as an input and having a result of detection of presence/absence of a malfunction as an output, thereby detecting presence/absence of a malfunction for each sensor signal.

In addition, the malfunction detecting unit 291 supplies only sensor signals of sensors that are not out of order among sensor signals included in transmission data supplied from the acquisition unit 131 to the object sound source generating unit 133.

In Step S253, the object sound source generating unit 133 generates an object sound source signal in accordance with detection results of malfunctions supplied from the malfunction detecting unit 291.

In other words, the object sound source generating unit 133 has sensor signals that are not out of order as its inputs, in other words, reads coefficient data of the object sound source generator 11 not using a sensor signal of a sensor of which a malfunction has been detected as its input from the coefficient database 132.

Then, the object sound source generating unit 133 generates an object sound source signal on the basis of the read coefficient data and the sensor signal supplied from the malfunction detecting unit 291.

When the object sound source signal is generated, in Step S254, the object sound source generating unit 133 outputs the generated object sound source signal, and the sound source generation process ends.

As described above, the sound source generating device 281 detects malfunctions of sensors on the basis of transmission data and generates an object sound source signal using coefficient data according to results of the detection.

In this way, even in a case in which some of sensors are out of order due to any reason, an object sound source signal can be robustly generated from sensor signals of the remaining sensors. In other words, an object sound source signal can be robustly generated for variations in the situation.

Fifth Embodiment

<Description of Learning Process>

In addition, at the time of recording (acquiring) learning data and teacher data used for learning and at the time of recording actual content, environment conditions of surroundings may be different from each other.

The environment conditions described here, for example, are environments of surroundings of a recording device such as an absorption coefficient according to a floor material, a type of shoes worn by a player or a performer that is an object, reverberation characteristics of a space in which recording is performed, a type of space in which recording is performed such as a closed space or an open space, a volume, a 3D shape, weather, a ground surface state, and a type of ground surface of a space (target space) in which recording is performed, and the like.

When an object sound source generator 11 is learned for each of such different environment conditions, an object sound source signal of sound quality, which is adapted to environments at the time of recording content, closer to those of reality can be acquired.

Figure 18:
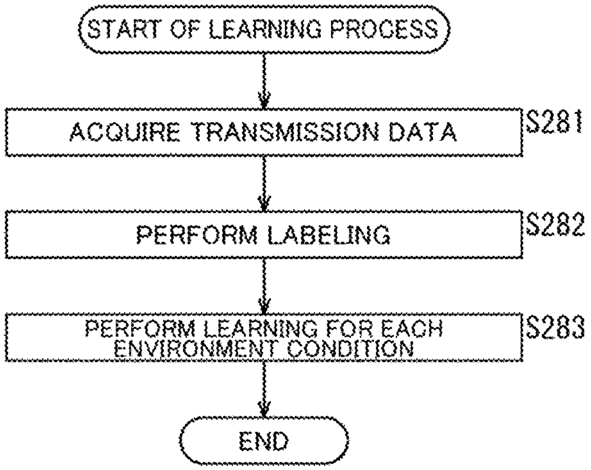
FIG. 18 is a flowchart for explaining learning processing.

In such a case, the learning device 52 illustrated in FIG. 3 performs a learning process illustrated in FIG. 18.

Hereinafter, the learning process performed using the learning device 52 will be described with reference to a flowchart illustrated in FIG. 18. Note that the processes of Steps S281 and S282 are the same as the processes of Steps S41 and S42 in FIG. 5, and thus description thereof will be omitted.

Here, in Step S282, the acquisition unit 81 performs a process of acquiring environment condition information representing environments of surroundings of a recording device 51 using a certain method and associating not only the sound source type information but also the environment condition information with a microphone recording signal, movement information, and position information as a labeling process.

For example, the environment condition information may be configured to be manually input by a user or the like, may be configured to be acquired using an image recognition process or the like on a video signal acquired by a camera, or may be acquired by obtaining weather information from a server via a network.

In Step S283, the learning unit 84 performs machine learning for each environment condition on the basis of the learning data recorded in the sensor database 82 and teacher data recorded in the microphone recording database 83.

In other words, the learning unit 84 performs machine learning only using learning data and teacher data with which environment condition information representing the same environment conditions are associated and generates coefficient data configuring the object sound source generator 11 for each environment condition.

The learning unit 84 supplies coefficient data for each environment condition acquired in this way to the coefficient database 85 and causes the coefficient data to be recorded therein, and the learning process ends.

As described above, the learning device 52 performs machine learning for each environment condition and generates coefficient data. In this way, an object sound source signal having sound quality closer to that of reality can be acquired using coefficient data according to an environment condition.

Configuration Example of Sound Source Generating Device

Figure 19:
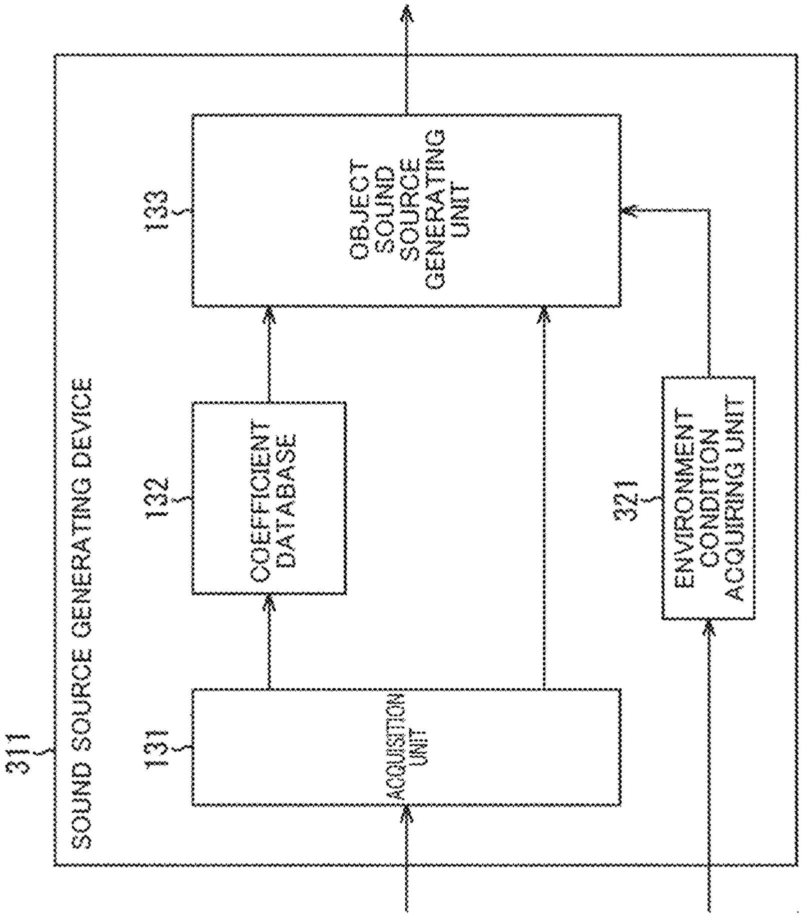
FIG. 19 is a diagram illustrating a configuration example of a sound source generating device.

In a case in which coefficient data is generated for each environment condition, the sound source generating device, for example, is configured as illustrated in FIG. 19. Note that the same reference signs will be applied to parts in FIG. 19 corresponding to the case in FIG. 6 and description thereof will be appropriately omitted.

The sound source generating device 311 illustrated in FIG. 19 includes an acquisition unit 131, a coefficient database 132, an environment condition acquiring unit 321, and an object sound source generating unit 133.

The configuration of the sound source generating device 311 is a configuration in which the environment condition acquiring unit 321 is newly disposed in the configuration of the sound source generating device 112. In addition, in the coefficient database 132, coefficient data is recorded for each environment condition.

The environment condition acquiring unit 321 acquires environment condition information representing environments (environment conditions) of surroundings of the recording device 111 and supplies the acquired environment condition information to the object sound source generating unit 133.

For example, the environment condition acquiring unit 321 may acquire information representing an environment condition input by a user or the like and set the information as environment condition information without any change or may set information representing weather of surroundings of the recording device 111 such as a clear sky or rain acquired from an external server or the like as environment condition information.

In addition, for example, the environment condition acquiring unit 321 may acquire a video signal having the surroundings of the recording device 111 as a subject, identify a ground surface state and a type of ground surface of the surroundings of the recording device 111 using image recognition for the video signal, an arithmetic operation process of a DNN having the video signal as an input, or the like, and generate environment condition information representing results of the identification.

Here, the ground surface state, for example, is a ground surface state that is determined in accordance with weather such as dry or after stop of rain or the like, and the type of ground surface, for example, is a type of ground surface determined in accordance with a material of the ground surface such as a hard material or grass. In addition, the environment condition is not limited to a video signal and may be identified by an arithmetic operation using an identifying unit such as a DNN on the basis of a certain observation value acquired by a temperature meter, a rain gauge, a hygrometer, or the like or arbitrary signal processing such as image recognition, a threshold process, or the like.

The object sound source generating unit 133 reads coefficient data corresponding to the environment condition information supplied from the environment condition acquiring unit 321 from the coefficient database 132 and generates an object sound source signal on the basis of the read coefficient data and the transmission data supplied from the acquisition unit 131.

<Description of Sound Source Generation Process>

Figure 20:
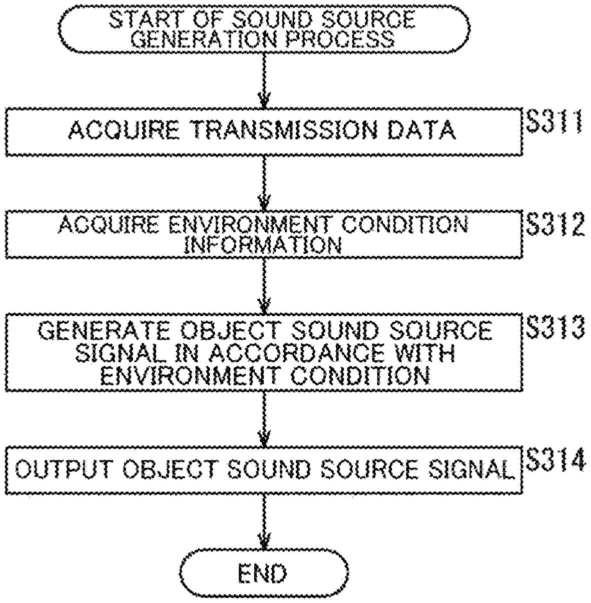
FIG. 20 is a flowchart for explaining a sound source generating process.

Next, a sound source generation process performed using the sound source generating device 311 will be described with reference to a flowchart illustrated in FIG. 20. A process of Step S311 is similar to the process of Step S101 illustrated in FIG. 8, and description thereof will be omitted.

In Step S312, the environment condition acquiring unit 321 acquires environment condition information and supplies the acquired environment condition information to the object sound source generating unit 133.

For example, the environment condition acquiring unit 321, as described above, acquires environment condition information by acquiring information representing weather from an external server and setting the acquired information as the environment condition information or by performing image recognition on a video signal or the like and identifying environment conditions.

In Step S313, the object sound source generating unit 133 generates an object sound source signal in accordance with the environment conditions.

In other words, the object sound source generating unit 133 reads coefficient data generated for environment conditions represented by the environment condition information supplied from the environment condition acquiring unit 321 from the coefficient database 132.

Then, the object sound source generating unit 133 performs an arithmetic operation process using the object sound source generator 11 on the basis of the read coefficient data and the transmission data supplied from the acquisition unit 131, thereby generating an object sound source signal.

In Step S314, the object sound source generating unit 133 outputs the generated object sound source signal, and the sound source generation process ends.

As described above, the sound source generating device 311 generates an object sound source signal using coefficient data corresponding to environment conditions. In this way, an object sound source signal having sound quality closer to that of reality, which is appropriate for the environment conditions, can be acquired.

Sixth Embodiment

Configuration Example of Learning Device

In addition, at the time of recording (acquiring) learning data and teacher data used for learning and at the time of recording actual content, qualities such as SN ratios of acquired sensor signals may be different from each other.

For example, a case in which a soccer game is recorded as content will be described.

In this case, recording of learning data and teacher data used for learning is performed at the time of practicing or the like, and thus there is a high possibility that a sensor signal having a high SN ratio (high quality) can be acquired like a case in which noises such as a glad of shout, a rustling sound, and the like of the surroundings are not included in a microphone recording signal as an acquired sensor signal or the like.

In contrast to this, since recording of actual content is performed at the time of a game, there is a high possibility that a sensor signal having a low SN ratio (low quality) can be acquired in which noises such as a glad of shout, a rustling sound, and the like of the surroundings are included in a microphone recording signal as the sensor signal that has been acquired.

In addition, like a case in which the amount of reverberation is small at the time of practicing, the amount of reverberation is large at the time of a game, and the like, reverberation characteristics of a surrounding space may be different at the time of practicing and at the time of a game.

Thus, at the time of recording learning data and teacher data, an environment having low reverberation and low noise compared to that at the time of recording content is assumed to be formed, in other words, a low SN environment is assumed at the time of recording content, and machine learning may be performed using learning data simulating such a low SN environment. In this way, an object sound source signal having higher quality can be acquired.

Figure 21:
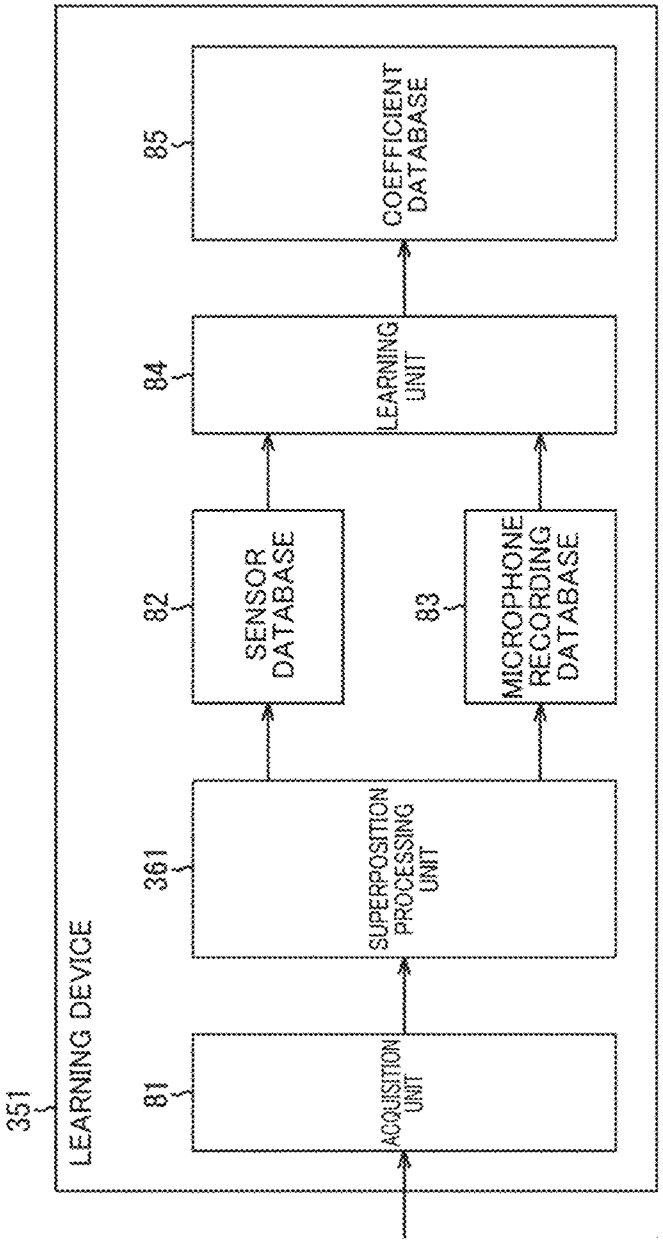
FIG. 21 is a diagram illustrating a configuration example of a learning device.

In such a case, for example, the learning device is configured as illustrated in FIG. 21. In FIG. 21, portions corresponding to those in FIG. 3 are denoted by the same reference numerals and signs, and description thereof will be appropriately omitted.

The learning device 351 illustrated in FIG. 21 includes an acquisition unit 81, a superposition processing unit 361, a sensor database 82, a microphone recording database 83, a learning unit 84, and a coefficient database 85.

A configuration of the learning device 351 is different from that of the learning device 52 in that the superposition processing unit 361 is newly disposed and is the same configuration as that of the learning device 52 in other points.

The superposition processing unit 361 does not perform any operation on a microphone recording signal as teacher data supplied from the acquisition unit 81, directly supplies the microphone recording signal as the teacher data to the microphone recording database 83, and causes the microphone recording signal to be recorded in the microphone recording database 83.

In addition, the superposition processing unit 361 performs a superposition process of convolution of noise-added data for adding reverberation and noise with a microphone recording signal as teacher data supplied from the acquisition unit 81, supplies a low-SN microphone recording signal acquired as a result thereof to the microphone recording database 83 as learning data, and causes the low-SN microphone recording signal to be recorded therein.

In addition, the noise-added data may be data acquired by adding at least one of a reverberation and a noise to the microphone recording signal.

The low-SN microphone recording signal having a low SN ratio, that is, low quality acquired in this way is a signal acquired in a low SN environment.

Thus, the low-SN microphone recording signal is close to a microphone recording signal that is actually acquired at the time of recording content, and thus, by using such a low-SN microphone recording signal as learning data, an object sound source signal can be predicted with higher accuracy. In other words, an object sound source signal having higher quality can be acquired.

The superposition processing unit 361 does not perform a superposition process for position information and movement information as learning data supplied from the acquisition unit 81, directly supplies the position information and the movement information to the sensor database 82 as learning data, and causes the position information and the movement information to be recorded therein.

In addition, for example, it may be also considered that, due to a player as an object being in contact with another player or the like, noise that is not present at the time of recording learning data is included in a sensor signal at the time of recording actual content. Thus, noise-added data used for adding such a noise may be prepared in advance, and the superposition processing unit 361 may supply data acquired by performing convolution of the noise-added data with position information and movement information to the sensor database 82 as learning data.

<Description of Learning Processing>

Figure 22:
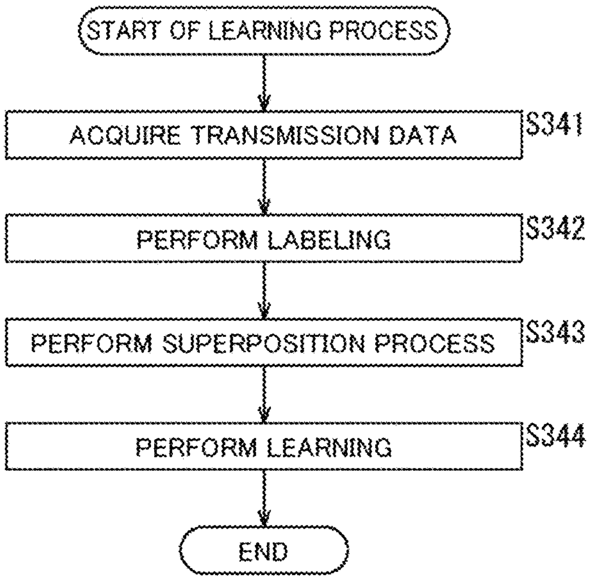
FIG. 22 is a flowchart for explaining learning processing.

Next, the learning process performed using the learning device 351 will be described with reference to a flowchart illustrated in FIG. 22.

Note that the processes of Steps S341 and S342 are the same as the processes of Steps S41 and S42 in FIG. 5, and thus description thereof will be omitted.

In Step S343, the superposition processing unit 361 performs a superposition process of performing convolution of noise-added data with a microphone recording signal supplied from the acquisition unit 81, supplies a low-SN microphone recording signal acquired as a result thereof to the microphone recording database 83 as learning data, and causes the low-SN microphone recording signal to be recorded therein.

In addition, the superposition processing unit 361 directly supplies a microphone recording signal supplied from the acquisition unit 81 to the microphone recording database 83 also as teacher data, causes the microphone recording signal to be recorded therein, also directly supplies position information and movement information supplied from the acquisition unit 81 to the sensor database 82 as learning data, and causes the position information and the movement information to be recorded therein. In addition, as described above, convolution of the position information and the movement information with noise-added data may be performed.

When the superposition process is performed, thereafter, the process of Step S344 is performed, and the learning process ends. The process of Step S344 is similar to the process of Step S43 illustrated in FIG. 5, and thus description thereof will be omitted.

Here, in Step S344, among a low-SN microphone recording signal and a plurality of sensor signals included in transmission data, position information and movement information that are sensor signals other than microphone recording signals to which reverberation or a noise is added are set as learning data.

Then, machine learning is performed on the basis of such learning data and the microphone recording signal as teacher data.

In this way, coefficient data of the object sound source generator 11 having position information, movement information, and a low-SN microphone recording signal as its inputs and having an object sound source signal as its output is generated.

As described above, the learning device 351 generates a low-SN microphone recording signal simulating recording under a low-SN environment from a microphone recording signal and performs machine learning using the low-SN microphone recording signal as learning data. In this way, also in a case in which a low-SN environment is formed at the time of recording content, an object sound source signal having higher quality can be acquired.

In addition, in this case, the microphone 61 is disposed in the recording device 111 at the time of recording content, and the sound source generating device 112 acquires transmission data including a microphone recording signal, position information, and movement information from the recording device 111. This microphone recording signal is recorded under the low-SN environment and thus corresponds to the low-SN microphone recording signal described above.

The sound source generating device 112 performs the process of Step S102 illustrated in FIG. 8, that is, an arithmetic operation process based on the object sound source generator 11 on the basis of a microphone recording signal, position information, and movement information included in transmission data and coefficient data, whereby an object sound source signal is generated.

In this case, unnecessary noises and the like are suppressed, and an object sound source signal having high quality, that is, a high SN ratio, can be acquired.

In addition, among the first embodiment to the sixth embodiment described above, arbitrary embodiments may be combined.

<Example of Configuration of Computer>

The above-described series of processing can also be performed by hardware or software. In the case where the series of processes is executed by software, a program that configures the software is installed on a computer. Here, the computer includes, for example, a computer built into dedicated hardware, a general-purpose personal computer on which various programs are installed to be able to execute various functions, and the like.

Figure 23:
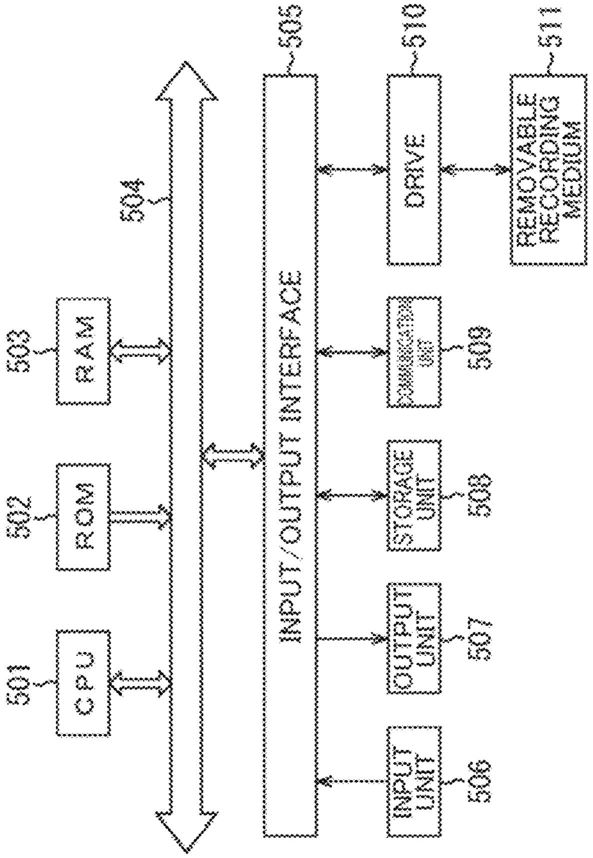
FIG. 23 is a diagram showing a configuration example of a computer.

FIG. 23 is a block diagram illustrating a configuration example of computer hardware that executes the above-described series of processing using a program.

In the computer, a central processing unit (CPU) 501, read-only memory (ROM) 502, and random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, or the like. The output unit 507 includes a display, a speaker, or the like. The recording unit 508 includes a hard disk, a nonvolatile memory, or the like. The communication unit 509 includes a network interface or the like. The drive 510 drives a removable recording medium 511 such as a magnetic disk, an optical disc, a magneto-optical disk, or a semiconductor memory.

In the computer configured as described above, for example, the above-described series of processing is performed by the CPU 501 loading a program recorded in the recording unit 508 into the RAM 503 through the input/output interface 505 and the bus 504 and executing the program.

The program executed by the computer (the CPU 501) can be recorded on, for example, the removable recording medium 511, as a packaged medium, and provided in such a state. The program can also be provided over a wired or wireless transmission medium such as a local area network, the Internet, or digital satellite broadcasting.

In the computer, the program can be installed in the recording unit 508 through the input/output interface 505 by mounting the removable recording medium 511 in the drive 510. Furthermore, the program can be received by the communication unit 509 over a wired or wireless transmission medium and installed in the recording unit 508. In addition, this program may be installed in advance in the ROM 502 or the recording unit 508.

Note that the program executed by a computer may be a program that performs processing chronologically in the order described in the present specification or may be a program that performs processing in parallel or at a necessary timing such as a called time.

Embodiments of the present technique are not limited to the above-described embodiments and can be changed variously within the scope of the present technique without departing from the gist of the present technique.

For example, the present technique may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of processes, the plurality of processes included in the one step can be executed by one device or executed in a shared manner by a plurality of devices.

Furthermore, the present technique can also be configured as follows.

(1)

A learning device including a learning unit configured to perform learning on the basis of one or a plurality of sensor signals acquired by one or a plurality of sensors mounted on an object and a target signal relating to the object and corresponding to a predetermined sensor and generate coefficient data configuring a generator having the one or the plurality of sensor signals as its inputs and having the target signal as its output.

(2)

The learning device described in (1), wherein the target signal is a sound source signal corresponding to a microphone as the predetermined sensor.

(3)

The learning device described in (2), wherein the target signal is an acoustic signal generated on the basis of a microphone recording signal acquired by the microphone as the predetermined sensor mounted on the object.

(4)

The learning device described in any one of (1) to (3), wherein the one or the plurality of sensors include at least one of a 9-axis sensor, a geomagnetic sensor, an acceleration sensor, a gyro sensor, a ranging sensor, a positioning sensor, an image sensor, and a microphone.

(5)

The learning device described in any one of (1) to (3), wherein the one or the plurality of sensors are sensors of types different from the microphone.

(6)

The learning device described in any one of (1) to (5), further including a correction processing unit configured to perform a correction process described in a positional relation between the object and another microphone on a microphone recording signal acquired by the other microphone not mounted on the object, wherein the learning unit performs the learning on the basis of the microphone recording signal after the correction process, the one or the plurality of sensor signals, and the target signal and generates the coefficient data configuring the generator having the microphone recording signal after the correction process and the one or the plurality of sensor signals as its inputs and having the target signal as its output.

(7)

The learning device described in any one of (1) to (5), wherein the learning unit performs the learning for each of combinations of the plurality of sensors and generates the coefficient data.

(8)

The learning device described in any one of (1) to (5), wherein the learning unit performs the learning for each of environment conditions of surroundings of the object and generates the coefficient data.

(9)

The learning device described in any one of (1) to (4), further including a superposition processing unit configured to add a reverberation or a noise to a microphone recording signal as the sensor signal acquired by a microphone as the sensor, wherein the learning unit performs the learning on the basis of the microphone recording signal to which the reverberation or the noise has been added, the sensor signals other than the microphone recording signal among the one or the plurality of sensor signals, and the target signal and generates the coefficient data configuring the generator having the microphone recording signal and the sensor signals other than the microphone recording signal as its inputs and having the target signal as its output.

(10)

A learning method using a learning device, the learning method including: performing learning on the basis of one or a plurality of sensor signals acquired by one or a plurality of sensors mounted on an object and a target signal relating to the object and corresponding to a predetermined sensor and generating coefficient data configuring a generator having the one or the plurality of sensor signals as its inputs and having the target signal as its output.

(11)

A program causing a computer to execute a process of performing learning on the basis of one or a plurality of sensor signals acquired by one or a plurality of sensors mounted on an object and a target signal relating to the object and corresponding to a predetermined sensor and generating coefficient data configuring a generator having the one or the plurality of sensor signals as its inputs and having the target signal as its output.

(12)

A signal processing device including: an acquisition unit configured to acquire one or a plurality of sensor signals acquired by one or a plurality of sensors mounted on an object; and a generation unit configured to generate a target signal relating to the object and corresponding to a predetermined sensor on the basis of coefficient data configuring a generator generated through learning in advance and the one or the plurality of sensor signals.

(13)

The signal processing device described in (12), wherein the target signal is a sound source signal corresponding to a microphone as the predetermined sensor that is mounted on the object.

(14)

The signal processing device described in (12) or (13), wherein the one or the plurality of sensors include at least one of a 9-axis sensor, a geomagnetic sensor, an acceleration sensor, a gyro sensor, a ranging sensor, a positioning sensor, an image sensor, and a microphone.

(15)

The signal processing device described in (12) or (13), wherein the one or the plurality of sensors are sensors of types different from the microphone.

(16)

The signal processing device described in any one of (12) to (15), wherein the acquisition unit further acquires a microphone recording signal acquired by another microphone not mounted on the object, the signal processing device further including a correction processing unit configured to perform a correction process described in a positional relation between the object and the other microphone on the microphone recording signal acquired by the other microphone, wherein the generation unit generates the target signal on the basis of the coefficient data, the microphone recording signal after the correction process, and the one or the plurality of sensor signals.

(17)

The signal processing device described in any one of (12) to (15), wherein the acquisition unit acquires the plurality of sensor signals, the signal processing device further including a malfunction detecting unit configured to detect malfunctions of the sensors on the basis of the plurality of sensor signals, wherein the generation unit generates the target signal on the basis of the sensor signals of the sensors that are not out of order among the plurality of sensor signals and the coefficient data configuring the generator having the sensor signals of the sensors that are not out of order as its inputs and having the target signal as its output.

(18)

The signal processing device described in any one of (12) to (15), further including an environment condition acquiring unit configured to acquire environment condition information representing environment conditions of surroundings of the object, wherein the generation unit generates the target signal on the basis of the coefficient data corresponding to the environment condition information and the one or the plurality of sensor signals.

(19)

A signal processing method using a signal processing device, the signal processing method including; acquiring one or a plurality of sensor signals acquired by one or a plurality of sensors mounted on an object; and generating a target signal relating to the object and corresponding to a predetermined sensor on the basis of coefficient data configuring a generator generated in advance through learning and the one or the plurality of sensor signals.

(20)

A program causing a computer to execute a process of; acquiring one or a plurality of sensor signals acquired by one or a plurality of sensors mounted on an object; and generating a target signal relating to the object and corresponding to a predetermined sensor on the basis of coefficient data configuring a generator generated in advance through learning and the one or the plurality of sensor signals.

REFERENCE SIGNS LIST

11 Object sound source generator
51 Recording device

52 Learning device
81 Acquisition unit
84 Learning unit
111 Recording device
112 Sound source generating device
131 Acquisition unit
133 Object sound source generating unit

The invention claimed is:

1. A learning device comprising:
a machine learner configured to perform learning on the basis of one or a plurality of sensor signals acquired by one or a plurality of sensors mounted on an object and a target signal relating to the object and corresponding to a predetermined sensor and generate coefficient data configuring a generator having the one or the plurality of sensor signals as its inputs and having the target signal as its output; and
a correction processor configured to perform a correction process according to a positional relation between the object and another microphone on a microphone recording signal acquired by the other microphone not mounted on the object,
wherein the machine learner performs the learning on the basis of the microphone recording signal after the correction process, the one or the plurality of sensor signals, and the target signal and generates the coefficient data configuring the generator having the microphone recording signal after the correction process and the one or the plurality of sensor signals as its inputs and having the target signal as its output.

2. The learning device according to claim 1, wherein the target signal is a sound source signal corresponding to a microphone as the predetermined sensor.

3. The learning device according to claim 2, wherein the target signal is an acoustic signal generated on the basis of a microphone recording signal acquired by the microphone as the predetermined sensor mounted on the object.

4. The learning device according to claim 1, wherein the one or the plurality of sensors include at least one of a 9-axis sensor, a geomagnetic sensor, an acceleration sensor, a gyro sensor, a ranging sensor, a positioning sensor, an image sensor, and a microphone.

5. The learning device according to claim 1, wherein the one or the plurality of sensors are sensors of types different from the microphone.

6. The learning device according to claim 1, wherein the machine learner performs the learning for each of combinations of the plurality of sensors and generates the coefficient data.

7. The learning device according to claim 1, wherein the machine learner performs the learning for each of environment conditions of the surroundings of the object and generates the coefficient data.

8. The learning device according to claim 1, further comprising a superposition processor configured to add a reverberation or a noise to a microphone recording signal as the sensor signal acquired by a microphone as the sensor, wherein the machine learner performs the learning on the basis of the microphone recording signal to which the reverberation or the noise has been added, the sensor signals other than the microphone recording signal among the one or the plurality of sensor signals, and the target signal and generates the coefficient data configuring the generator having the microphone recording signal and the sensor signals other than the microphone recording signal as its inputs and having the target signal as its output.

9. A learning method using a learning device, the learning method comprising:
performing learning on the basis of one or a plurality of sensor signals acquired by one or a plurality of sensors mounted on an object and a target signal relating to the object and corresponding to a predetermined sensor;
generating coefficient data configuring a generator having the one or the plurality of sensor signals as its inputs and having the target signal as its output; and
performing a correction process according to a positional relation between the object and another microphone on a microphone recording signal acquired by the other microphone not mounted on the object,
wherein the learning is performed on the basis of the microphone recording signal after the correction process, the one or the plurality of sensor signals, and the target signal and generates the coefficient data configuring the generator having the microphone recording signal after the correction process and the one or the plurality of sensor signals as its inputs and having the target signal as its output.

10. A non-transitory computer readable medium storing instructions that, when executed by a computer, cause the computer to execute the processes of:
performing learning on the basis of one or a plurality of sensor signals acquired by one or a plurality of sensors mounted on an object and a target signal relating to the object and corresponding to a predetermined sensor;
generating coefficient data configuring a generator having the one or the plurality of sensor signals as its inputs and having the target signal as its output; and
performing a correction process according to a positional relation between the object and another microphone on a microphone recording signal acquired by the other microphone not mounted on the object,
wherein the learning is performed on the basis of the microphone recording signal after the correction process, the one or the plurality of sensor signals, and the target signal and generates the coefficient data configuring the generator having the microphone recording signal after the correction process and the one or the plurality of sensor signals as its inputs and having the target signal as its output.

11. A signal processing device comprising:
A data acquirer configured to acquire one or a plurality of sensor signals acquired by one or a plurality of sensors mounted on an object; and
An object sound source generator configured to generate a target signal relating to the object and corresponding to a predetermined sensor on the basis of coefficient data configuring a generator generated in advance through learning and the one or the plurality of sensor signals,
wherein the data acquirer further acquires a microphone recording signal acquired by another microphone not mounted on the object, the signal processing device further comprising a correction processor configured to perform a correction process according to a positional relation between the object and the other microphone, on the microphone recording signal acquired by the other microphone,
wherein the object sound source generator generates the target signal on the basis of the coefficient data, the microphone recording signal after the correction process, and the one or the plurality of sensor signals.

12. The signal processing device according to claim 11, wherein the target signal is a sound source signal corresponding to a microphone as the predetermined sensor that is mounted on the object.

13. The signal processing device according to claim 11, wherein the one or the plurality of sensors include at least one of a 9-axis sensor, a geomagnetic sensor, an acceleration sensor, a gyro sensor, a ranging sensor, a positioning sensor, an image sensor, and a microphone.

14. The signal processing device according to claim 11, wherein the one or the plurality of sensors are sensors of types different from the microphone.

15. The signal processing device according to claim 11, wherein the data acquirer acquires the plurality of sensor signals, the signal processing device further comprising a malfunction detector configured to detect malfunctions of the sensors on the basis of the plurality of sensor signals, wherein the object sound source generator-generation unit generates the target signal on the basis of the sensor signals of the sensors that are not out of order among the plurality of sensor signals and the coefficient data configuring the generator having the sensor signals of the sensors that are not out of order as its inputs and having the target signal as its output.

16. The signal processing device according to claim 11, further comprising an environment condition acquirer configured to acquire environment condition information representing environment conditions of surroundings of the object, wherein the object sound source generator generates the target signal on the basis of the coefficient data corresponding to the environment condition information and the one or the plurality of sensor signals.

17. A signal processing method using a signal processing device, the signal processing method comprising:

acquiring one or a plurality of sensor signals acquired by one or a plurality of sensors mounted on an object; and generating a target signal relating to the object and corresponding to a predetermined sensor on the basis of coefficient data configuring a generator generated in advance through learning and the one or the plurality of sensor signals, wherein acquiring a microphone recording signal acquired by another microphone not mounted on the object, performing a correction process according to a positional relation between the object and the other microphone, on the microphone recording signal acquired by the other microphone, wherein the target signal is generated on the basis of the coefficient data, the microphone recording signal after the correction process, and the one or the plurality of sensor signals.

18. A non-transitory computer readable medium storing instructions that, when executed by a computer, cause the computer to execute the processes of:

acquiring one or a plurality of sensor signals acquired by one or a plurality of sensors mounted on an object; and generating a target signal relating to the object and corresponding to a predetermined sensor on the basis of coefficient data configuring a generator generated in advance through learning and the one or the plurality of sensor signals, wherein acquiring a microphone recording signal acquired by another microphone not mounted on the object, performing a correction process according to a positional relation between the object and the other microphone, on the microphone recording signal acquired by the other microphone, wherein the target signal is generated on the basis of the coefficient data, the microphone recording signal after the correction process, and the one or the plurality of sensor signals.

* * * * *